US012634591B2

(12) United States Patent
Dong et al.

(10) Patent No.: US 12,634,591 B2
(45) Date of Patent: May 19, 2026

(54) POINT LIGHT SOURCE IMAGE DETECTION METHOD AND ELECTRONIC DEVICE

(71) Applicant: Honor Device Co., Ltd., Shenzhen (CN)

(72) Inventors: Zhen Dong, Shenzhen (CN); Shiyu Zhu, Shenzhen (CN); Yonghua Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 163 days.

(21) Appl. No.: 18/546,498

(22) PCT Filed: May 10, 2022

(86) PCT No.: PCT/CN2022/091883
§ 371 (c)(1),
(2) Date: Aug. 15, 2023

(87) PCT Pub. No.: WO2023/015990
PCT Pub. Date: Feb. 16, 2023

(65) Prior Publication Data
US 2024/0137659 A1     Apr. 25, 2024
US 2024/0236504 A9     Jul. 11, 2024

(30) Foreign Application Priority Data
Aug. 12, 2021    (CN) .......................... 202110926878.8

(51) Int. Cl.
*H04N 23/80*       (2023.01)
*H04N 23/741*     (2023.01)
(52) U.S. Cl.
CPC ........... *H04N 23/80* (2023.01); *H04N 23/741* (2023.01); *G06T 2207/20208* (2013.01)

(58) Field of Classification Search
None
See application file for complete search history.

(56) References Cited

U.S. PATENT DOCUMENTS

| | | | |
|---|---|---|---|
| 6,792,203 B1 * | 9/2004 | Ide .......................... | G01S 17/89 |
| | | | 396/234 |
| 7,612,804 B1 * | 11/2009 | Marcu .................. | H04N 25/589 |
| | | | 348/222.1 |

(Continued)

FOREIGN PATENT DOCUMENTS

| | | |
|---|---|---|
| CN | 104853087 A | 8/2015 |
| CN | 105872355 A | 8/2016 |

(Continued)

*Primary Examiner* — Quan Pham
(74) *Attorney, Agent, or Firm* — WOMBLE BOND DICKINSON (US) LLP

(57) ABSTRACT

This application relates to the field of image processing, and provides a point light source image detection method and an electronic device. The method includes: obtaining to-be-tested images, and determining pixel brightnesses of the to-be-tested images; determining low-brightness pixels and high-brightness pixels in the images based on the pixel brightnesses; filtering, based on the low-brightness pixels, out an image that does not meet a preset dark environment requirement, and filtering, based on the high-brightness pixels, out an image that does not meet a preset point light source size; and determining, based on a result of the filtering, whether a to-be-tested image is a point light source image. Pixels in images are classified into low-brightness pixels and high-brightness pixels. For the low-brightness pixels, the images are screened based on a preset dark environment requirement, so that the selected point light source images meet the preset dark environment requirement.

16 Claims, 11 Drawing Sheets

(56)             References Cited

U.S. PATENT DOCUMENTS

| | | | |
|---|---|---|---|
| 9,413,946 B2 * | 8/2016 | Hamano | H04N 23/673 |
| 9,654,684 B2 | 5/2017 | Miyazawa et al. | |
| 9,979,875 B2 | 5/2018 | Lv et al. | |
| 2004/0063481 A1 * | 4/2004 | Wang | A63F 13/577 |
| | | | 463/8 |
| 2006/0109422 A1 * | 5/2006 | Clark | A61B 3/112 |
| | | | 351/204 |
| 2007/0086767 A1 | 4/2007 | Nakai | |
| 2011/0157425 A1 * | 6/2011 | Nakayama | H04N 23/71 |
| | | | 348/234 |
| 2011/0187905 A1 | 8/2011 | Sugimoto et al. | |
| 2012/0070084 A1 * | 3/2012 | Yu | G06T 5/92 |
| | | | 382/190 |
| 2013/0177206 A1 | 7/2013 | Hata | |
| 2013/0335619 A1 | 12/2013 | Itoh | |
| 2018/0020142 A1 | 1/2018 | Park et al. | |

FOREIGN PATENT DOCUMENTS

| | | |
|---|---|---|
| CN | 106534677 A | 3/2017 |
| CN | 111524089 A | 8/2020 |
| CN | 113163123 A | 7/2021 |
| CN | 111418201 B | 10/2021 |
| CN | 113810603 A | 12/2021 |
| EP | 3361236 A1 | 8/2018 |

* cited by examiner

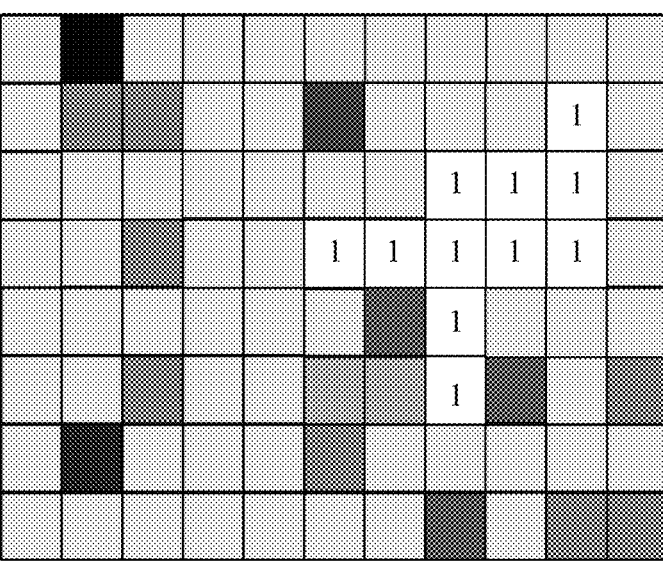

FIG. 4

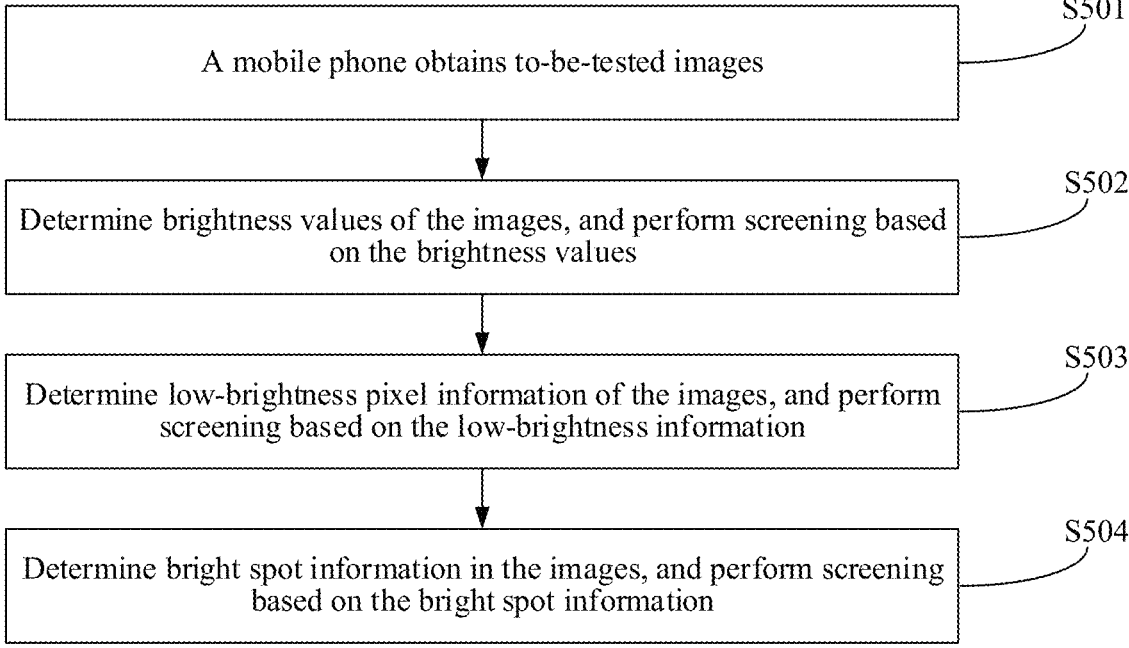

A mobile phone obtains to-be-tested images — S501

Determine brightness values of the images, and perform screening based on the brightness values — S502

Determine low-brightness pixel information of the images, and perform screening based on the low-brightness information — S503

Determine bright spot information in the images, and perform screening based on the bright spot information — S504

CONT.
FROM

POINT LIGHT SOURCE IMAGE DETECTION METHOD AND ELECTRONIC DEVICE

CROSS-REFERENCE TO RELATED APPLICATIONS

This application is a National Stage of International Application No. PCT/CN2022/091883 filed on May 10, 2022, which claims priority to Chinese Patent Application No. 202110926878.8 filed on Aug. 12, 2021, both of which are incorporated herein by references in their entireties.

TECHNICAL FIELD

This application relates to the field of image processing, and in particular, to a point light source image detection method and an electronic device.

BACKGROUND

In computer graphics and cinematography technology, high-dynamic range (HDR) imaging technology is a set of technologies used to achieve a wider exposure dynamic range than a conventional digital imaging technology. HDR images generated through the high-dynamic range imaging technology can provide a wider dynamic range and image details, and better reflect visual effects in a real-world environment.

During generation of HDR images, it is necessary to detect overexposed regions and underexposed regions of low-dynamic range (LDR) images with different exposure times. In the current detection method, by detecting pixel brightnesses in images, an overexposed region and an underexposed region in the images are usually determined based on the pixel brightnesses. However, since a point light source or a white object may exist in the image, the point light source image cannot be accurately detected according to the detection method of the overexposed region, and it is not convenient to obtain a HDR image with better definition.

SUMMARY

Embodiments of this application provide a point light source image detection method and an electronic device, so as to solve the problems that in an image overexposure detection mode in the prior art, a point light source image cannot be accurately detected and it is not convenient to obtain a sharper HDR image.

According to a first aspect, an embodiment of this application provides a point light source image detection method, including: obtaining to-be-tested images, and determining pixel brightnesses of the to-be-tested images; determining low-brightness pixels and high-brightness pixels in the images based on the pixel brightnesses, where each of the low-brightness pixels is a pixel whose brightness is less than a preset first brightness threshold, and each of the high-brightness pixels is a pixel whose brightness is greater than or equal to a preset second brightness threshold; filtering, based on the low-brightness pixels, out an image that does not meet a preset dark environment requirement, and filtering, based on the high-brightness pixels, out an image that does not meet a preset point light source size; and determining, based on a result of the filtering, whether a to-be-tested image is a point light source image.

The to-be-tested images may be one or more images. For example, in scenes of photo capturing, scene image preview, and video shooting, the to-be-tested images may be images with different exposure values. During detection of the to-be-tested images with different exposure values, an image with a normal exposure value, a small exposure value, or a large exposure value may be selected for comparison and determination based on preset requirements.

Pixels in the images are classified to obtain low-brightness pixels and high-brightness pixels. The images with the low-brightness pixels are screened by using a preset dark environment requirement, and the images with high-brightness pixels are screened based on a size characteristic of a point light source, so that the selected point light source images meet the preset dark environment requirement. Moreover, the point light sources are screened based on a size characteristic of a point light source, to avoid repetition of the selected point light source images with an overexposed region in a HDR detection process, thereby improving precision of the screened point light source images.

With reference to the first aspect, in a first possible implementation of the first aspect, the filtering, based on the low-brightness pixels, out an image that does not meet a preset dark environment requirement includes: determining a first pixel proportion of the low-brightness pixels in the image; and filtering out a non-point light source image in which the first pixel proportion is less than a preset first proportion threshold.

In order to meet the requirement that the point light source image is an image in a dark environment, the first pixel proportion may be determined based on the determined proportion of the low-brightness pixels to total pixels of the image. The first pixel proportion is compared with the preset first proportion threshold. If the first pixel proportion is less than the first proportion threshold, it means that excessively few dark regions exist in the background, and the image may be determined as a non-point light source image.

With reference to the first aspect or the first possible implementation of the first aspect, in a second possible implementation of the first aspect, the filtering, based on the low-brightness pixels, out an image that does not meet a preset dark environment requirement includes: determining an average brightness of the low-brightness pixels; and filtering out a non-point light source image in which the average brightness of the low-brightness pixels is less than a preset average brightness threshold.

During screening of the dark environment through the proportion information of low-brightness pixels in the images, a case that the number of low-brightness pixels meets the requirement but the brightnesses of the low-brightness pixels in the images are not low enough may exist. Therefore, the images may be further screened through the average brightness of the low-brightness pixels.

The average brightness may be an average of brightnesses of normalized pixels of the low-brightness pixels. Based on the average of brightnesses of normalized pixels, it is convenient to normalize pixels within different brightness ranges to a proportion of the pixel brightness to a maximum brightness value.

In a possible implementation, the filtering, based on the high-brightness pixels, out an image that does not meet a preset point light source size includes: connecting the high-brightness pixels to generate a high-brightness region; determining a second pixel proportion of pixels of a single high-brightness region in the image; and filtering, based on the second pixel proportion, out a non-point light source image that does not meet the preset point light source size.

During generation of a high-brightness region, a connected region may be determined with a four-neighborhood, or a connected region may be determined with an eight-neighborhood. The connected region determined based on the high-brightness pixels may include large-area bright spots or point light source bright spots. It may be determined based on large-area brightnesses and detection results of the point light source bright spots whether the image is a point light source image.

During screening of the images based on the bright spots, the filtering, based on the second pixel proportion, out an image that does not meet a preset point light source size includes: determining a number of high-brightness regions in which the second pixel proportion belongs to a preset first proportion range and a number of high-brightness regions in which the second pixel proportion belongs to a preset second proportion range, where the first proportion range is smaller than the second proportion range; if a high-brightness region in which the second pixel proportion belongs to the preset second proportion range exists in the image, the image is an image that does not meet the preset point light source size; or if the high-brightness region in which the second pixel proportion belongs to the preset second proportion range does not exist, and the number of high-brightness regions in which the second pixel proportion belongs to the first proportion range is 0, the image is an image that does not meet the preset point light source size.

For large-area bright spots, the number of high-brightness pixels in the corresponding connected region may be greater than a preset pixel number threshold, or the proportion of pixels in the connected region in the image may be greater than the second pixel proportion, which indicates that the bright spot region in the image has a relatively large area, so that the corresponding underexposed image may be directly obtained through the overexposure detection method based on HDR image composition, and the generated HDR image is optimized based on obtained details in the underexposed image. If no large-area bright spots exist in the image, and a small area of bright spots can be effectively detected, the small area of bright spots meet the preset first proportion range, and the image is determined as a point light source image.

It can be seen from the above that the brightness of the background region of the point light source image determined through this embodiment of this application is relatively low, which meets the preset dark environment requirement, and a size of the high-brightness region formed by the high-brightness pixels included in the image, that is, the bright spots, is less than the preset size or scale requirements. Moreover, the second pixel proportion of the bright spots belongs to the preset first proportion range, that is, the bright spots meet the preset point light source size requirement, and then the image is determined as a point light source image, so that it is convenient to obtain sharper and more effective images during HDR image composition.

For example, the connecting the high-brightness pixels to generate a high-brightness region includes: generating the high-brightness region by searching for high-brightness pixels with a four-neighborhood of the high-brightness pixels; or generating the high-brightness region by searching for high-brightness pixels with an eight-neighborhood of the high-brightness pixels. The sizes of high-brightness regions generated by searching for high-brightness pixels in different neighborhood ranges may also be different. The first proportion range and the second proportion range for comparison may be adjusted accordingly.

In some possible implementations of the first aspect, before the determining low-brightness pixels and high-brightness pixels in the images based on the pixel brightnesses, the method further includes: obtaining brightnesses of the to-be-tested images; and determining that each of the to-be-tested images is a non-point light source image when each of the brightnesses is greater than a preset third brightness threshold.

The brightness of the image may be read directly from an image sensor chip, or may be calculated based on capturing parameters of the image, including parameters such as sensitivity and an aperture size. Alternatively, the brightness of the image may be calculated based on the brightness of each pixel in the image.

According to a second aspect, an embodiment of this application provides an image processing method. The image processing method includes: determining two or more to-be-processed images; performing point light source detection on the to-be-processed image according to the method in the first aspect, and determining whether the to-be-processed images are point light source images; determining a high-brightness region in each of the point light source images when determining that the to-be-tested images include the point light source image; and performing fusion calculation for high-dynamic range images based on the point light source images and the marked high-brightness region.

Based on the point light source image obtained in the first aspect, the preset dark environment requirement is met, and the size of bright spots in the image meets the preset point light source size requirement. The corresponding image with a small exposure value may be found based on the point light source image, and a sharper composited image can be obtained based on detailed information located at the point light source in the image with the small exposure value.

According to a third aspect, an embodiment of this application provides a point light source image detection device. The device includes: an image obtaining unit, configured to obtain to-be-tested images, and determine pixel brightnesses of the to-be-tested images; a pixel determining unit, configured to determine low-brightness pixels and high-brightness pixels in the image based on the pixel brightnesses, where each of the low-brightness pixels is a pixel whose brightness is less than a preset first brightness threshold, and each of the high-brightness pixels is a pixel whose brightness is greater than or equal to a preset second brightness threshold; an image filtering unit, configured to filter, based on the low-brightness pixels, out an image that does not meet a preset dark environment requirement, and filter, based on the high-brightness pixels, out an image that does not meet a preset point light source size; and a point light source image determining unit, configured to determine, based on a result of the filtering, whether a to-be-tested image is a point light source image.

The point light source image detection device shown in the third aspect corresponds to the point light source image detection method in the first aspect.

According to a fourth aspect, an electronic device provided in this embodiment of this application includes a memory, a processor, and a computer program stored in the memory and executable by the processor. When the processor executes the computer program, the method according to any one of the first aspect or the second aspect is implemented.

According to a fifth aspect, an embodiment of this application provides a computer-readable storage medium, storing a computer program. When the computer program is executed by a processor, the method according to any one of the first aspect or the second aspect is implemented.

According to a sixth aspect, an embodiment of this application provides a chip system. The chip system includes a processor, and the processor is coupled to a memory and configured to execute a computer program stored in the memory, to implement the method according to any one of the first aspect or the second aspect. The chip system may be a single chip or a chip module composed of a plurality of chips.

According to a seventh aspect, an embodiment of this application provides a computer program product, the computer program product, when run on an electronic device, causing the electronic device to perform the method according to any one of the first aspect or the second aspect.

It may be understood that, for beneficial effects of the second aspect to the seventh aspect, reference may be made to the related description in the first aspect, and details are not described herein again.

BRIEF DESCRIPTION OF DRAWINGS

FIG. 4 is a schematic diagram of an existing point light source detection method;

FIG. 5 is a schematic diagram of an implementation process of a point light source detection method according to an embodiment of this application;

DESCRIPTION OF EMBODIMENTS

Figure 1:
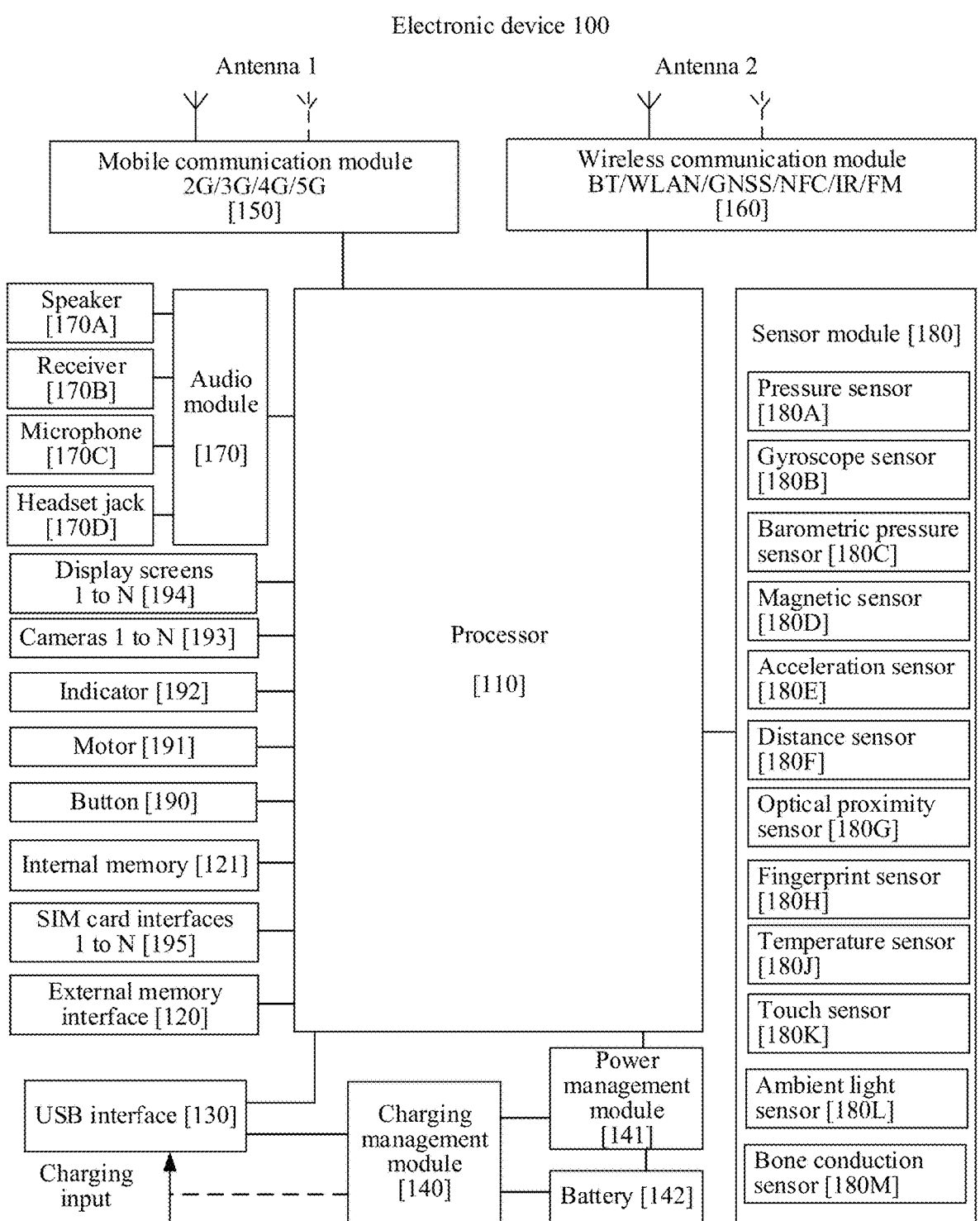
FIG. 1 is a schematic structural diagram of an electronic device according to an embodiment of this application.

In the following description, specific details such as a specific system structure and technology are provided for the purpose of description rather than limitation, so as to thoroughly understand embodiments of this application.

Related contents that may be involved in the embodiments of this application are described by using examples.

(1) Electronic device: The electronic device includes a processor 110, an external memory interface 120, an internal memory 121, a universal serial bus (USB) interface 130, a charging management module 140, a power management unit 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, a proximity light sensor 180G, a fingerprint sensor 180H, a temperature sensor 180J, a touch sensor 180K, an ambient light sensor 180L, a bone conduction sensor 180M, and the like.

It may be understood that an example structure in this embodiment of the present invention does not constitute a specific limitation on the electronic device 100. In some other embodiments of this application, the electronic device 100 may include more or fewer components than those shown in the figure, or some components may be combined, or some components may be divided, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be separate devices, or may be integrated into one or more processors.

The controller may generate an operation control signal based on instruction operation code and a time-sequence signal, and control obtaining and executing of instructions.

A memory may further be arranged in the processor 110, configured to store instructions and data. In some embodiments, the memory in the processor 110 is a cache memory. The memory may store instructions or data recently used or cyclically used by the processor 110. If the processor 110 needs to use the instruction or the data again, the processor may directly invoke the instruction or the data from the memory. Repeated access is avoided, and waiting time of the processor 110 is reduced, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus and includes a serial data line (SDA) and a serial clock line (SCL). In some embodiments, the processor 110 may include a plurality of I2C buses. The processor 110 may be respectively coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of I2S buses. The processor 110 may be coupled to the audio module 170 through the I2S bus to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to perform audio communication, and sample, quantize, and encode an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement the function of answering a call through a Bluetooth headset. Both the I2S interface and the PCM interface may be configured to perform audio communication.

The UART interface is a universal serial data bus and is configured to perform asynchronous communication. The bus may be a bidirectional communication bus. The bus converts data to be transmitted between serial communication and parallel communication. In some embodiments, the UART interface is usually configured to connect the processor 110 to the wireless communication module 160. For example, the processor 110 communicates with a Bluetooth module in the wireless communication module 160 through a UART interface, to implement a Bluetooth function. In some embodiments, the audio module 170 may transmit an audio signal to the wireless communication module 160 through the UART interface, to implement a function of playing music through the Bluetooth headset.

The MIPI may be configured to connect the processor 110 to a peripheral device such as the display screen 194 or the camera 193. The MIPI includes a camera serial interface (CSI), a display serial interface (DSI), and the like. In some embodiments, the processor 110 communicates with the camera 193 through the CSI interface, to implement a photographing function of the electronic device 100. The processor 110 communicates with the display screen 194 through the DSI interface, to implement a display function of the electronic device 100.

A GPIO interface may be configured by software. The GPIO interface may be configured as a control signal or a data signal. In some embodiments, the GPIO interface may be configured to connect the processor 110 to the camera 193, the display screen 194, the wireless communication module 160, the audio module 170, the sensor module 180, and the like. The GPIO interface may further be configured as an I2C interface, an I2S interface, a UART interface, an MIPI, and the like.

The USB interface 130 is an interface that complies with the USB standard specification, and may be specifically a Mini USB interface, a Micro USB interface, a USB Type C interface, and the like. The USB interface 130 may be configured to be connected to the charger to charge the electronic device 100, or may be configured for data transmission between the electronic device 100 and the peripheral device. The interface may alternatively be configured to be connected to a headset to play audio through the headset. The interface may further be configured to be connected to another electronic device such as an AR device.

It may be understood that an interface connection relationship between the modules illustrated in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input through a wireless charging coil of the electronic device 100. The charging management module 140 may further supply power to the electronic device through the power management module 141 while charging the battery 142.

The power management module 141 is configured to be connected to the battery 142, the charging management module 140, and the processor 110. The power management module 141 receives an input of the battery 142 and/or the charging management module 140, to supply power to the processor 110, the internal memory 121, the display screen 194, the camera 193, the wireless communication module 160, and the like. The power management module 141 may further be configured to monitor parameters such as a battery capacity, a quantity of battery cycles, and a battery health status (power leakage and impedance). In some other embodiments, the power management module 141 may alternatively be arranged in the processor 110. In some other embodiments, the power management module 141 and the charging management module 140 may also be arranged in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may further be multiplexed to improve utilization of the antennas. For example, the antenna 1 may be multiplexed into a diversity antenna of a wireless local area network. In some other embodiments, the antennas may be used in combination with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit the processed electromagnetic wave to the modem processor for demodulation. The mobile communication module 150 may further amplify a signal modulated by the modem processor, and convert the signal into an electromagnetic wave through the antenna 1 for radiation. In some embodiments, at least some functional modules of the mobile communication module 150 may be arranged in the processor 110. In some embodiments, at least some of the functional modules of the mobile communication module 150 may be arranged in a same device as at least some modules of the processor 110.

The modem processor may include a modulator and a demodulator. The modulator is configured to modulate a to-be-transmitted low-frequency baseband signal into a medium and high frequency signal. The demodulator is configured to demodulate the received electromagnetic wave signal into a low-frequency baseband signal. Then the demodulator transfers the low-frequency baseband signal obtained through demodulation to the baseband processor for processing. The low-frequency baseband signal is processed by the baseband processor and then transferred to an application processor. The application processor outputs a sound signal through an audio device (which is not limited to the speaker 170A, the receiver 170B, and the like), or displays an image or a video through the display screen 194. In some embodiments, the modem processor may be an independent device. In some other embodiments, the modem processor may be independent of the processor 110, and is arranged in a same device as the mobile communication module 150 or another functional module.

The wireless communication module 160 may provide a solution to wireless communication applied to the electronic device 100, for example, a wireless local area network (WLAN) (for example, a wireless fidelity (Wi-Fi) network), Bluetooth (BT), a global navigation satellite system (GNSS), frequency modulation (FM), near field communication (NFC), and an infrared (IR) technology. The wireless communication module 160 may be one or more devices into which at least one communication processing module is integrated. The wireless communication module 160 receives an electromagnetic wave through the antenna 2, performs frequency modulation on and filters the electromagnetic wave signal, and transmits a processed signal to the processor 110. The wireless communication module 160 may further receive a to-be-transmitted signal from the processor 110, perform frequency modulation on and amplify the to-be-transmitted signal, and convert the to-be-transmitted signal into an electromagnetic wave through the antenna 2 for radiation.

In some embodiments, the antenna 1 and the mobile communication module 150 are coupled, and the antenna 2 and the wireless communication module 160 of the electronic device 100 are coupled, so that the electronic device 100 can communicate with a network and another device through a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a beidou navigation satellite system (BDS), a quasi-zenith satellite system (QZSS), and/or a satellite based augmentation system (SBAS).

The electronic device 100 implements a display function through the GPU, the display screen 194, the application processor, and the like. The GPU is a microprocessor for image processing and connects the display screen 194 to the application processor. The GPU is configured to perform mathematical and geometric calculation, and is configured to perform graphics rendering. The processor 110 may include one or more GPUs that execute a program instruction to generate or change display information.

The display screen 194 is configured to display an image, a video, and the like. The display screen 194 includes a display panel. The display panel may use a liquid crystal display (LCD), an organic light-emitting diode (OLED), an active-matrix organic light emitting diode (AMOLED), a flexible light-emitting diode (FLED), a MiniLED, a MicroLED, a Micro-OLED, a quantum dot light emitting diode (QLED), and the like. In some embodiments, the electronic device 100 may include 1 or N display screens 194. N is a positive integer greater than 1.

The electronic device 100 may implement a photographing function through the ISP, the camera 193, the video codec, the GPU, the display screen 194, the application processor, and the like.

The ISP is configured to process data fed back by the camera 193. For example, during photographing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may further optimize algorithms of noise point, brightness, and skin tone of the image. The ISP may further optimize parameters such as exposure and color temperature of a photographed scene. In some embodiments, the ISP may be arranged in the camera 193.

The camera 193 is configured to capture a still image or video. An optical image is generated for an object through the lens and is projected onto the photosensitive element. The photosensitive element may be a charge coupled device (CCD) or a complementary metal-oxide-semiconductor (CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in standard formats such as RGB and YUV. In some embodiments, the electronic device 100 may include 1 or N cameras 193, and N is a positive integer greater than 1.

The digital signal processor is configured to process a digital signal, and in addition to a digital image signal, the digital signal processor may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (MPEG) 1, MPEG 2, MPEG 3, and MPEG 4.

The NPU is a neural network (NN) computing processor, and quickly processes input information by using a biological neural network structure such as a mode of transmission between human-brain nerve cells, and may further constantly perform self-learning. The NPU may be configured to implement an application such as intelligent cognition of the electronic device 100, for example, image recognition, face recognition, voice recognition, and text understanding.

The external memory interface 120 may be configured to be connected to an external storage card such as a micro SD card, to expand a storage capability of the electronic device 100. The external storage card communicates with the processor 110 through the external memory interface 120, to implement a data storage function. For example, files such as music and a video are stored into the external storage card.

The internal memory 121 may be configured to store computer-executable program code. The executable program code includes an instruction. The internal memory 121 may include a program storage area and a data storage area. The program storage area may store an operating system, an application required by at least one function (such as a sound playback function and an image display function), and the like. The data storage area may store data (such as audio data and an address book) and the like created during use of the electronic device 100. In addition, the internal memory 121 may include a high-speed random access memory, and may further include a non-volatile memory, for example, at least one magnetic disk storage device, a flash memory device, or a universal flash storage (UFS). The processor 110 runs the instruction stored in the internal memory 121, and/or the instruction stored in the memory arranged in the processor, to perform various function applications and data processing of the electronic device 100.

The electronic device 100 may implement an audio function such as music playing or recording through the audio module 170, the speaker 170A, the receiver 170B, the microphone 170C, the headset jack 170D, the application processor, and the like, for example, music playback and recording.

The audio module 170 is configured to convert digital audio information into analog audio signal output, and is also configured to convert analog audio input into a digital audio signal. The audio module 170 may further be configured to encode and decode an audio signal. In some embodiments, the audio module 170 may be arranged in the processor 110, or some functional modules of the audio module 170 are arranged in the processor 110.

The speaker 170A, also referred to as a "horn", is configured to convert an electrical audio signal into a sound signal. Music may be listened to or a hands-free call may be answered through the speaker 170A in the electronic device 100.

The receiver 170B, also referred to as a "handset", is configured to convert an electrical audio signal into a sound signal. When the electronic device 100 is configured to answer a call or receive voice information, the receiver 170B may be put close to a human ear to receive a voice.

The microphone 170C, also referred to as a "voice tube" or "mike", is configured to convert a sound signal into an electrical signal. When making a call or transmitting voice information, a user may make a sound approaching the microphone 170C through a mouth of the user, to input a sound signal into the microphone 170C. At least one microphone 170C may be arranged in the electronic device 100.

In some other embodiments, two microphones 170C may be arranged in the electronic device 100, which not only can collect sound signals but also can implement noise reduction. In some other embodiments, three, four, or more microphones 170C may be alternatively arranged in the electronic device 100, to collect a sound signal, implement noise reduction, recognize a sound source, implement a directional recording function, and the like.

The headset jack 170D is configured to be connected to a wired headset. The headset jack 170D may be a USB interface 130, or may be a 3.5 mm open mobile electronic device platform (OMTP) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be arranged in the display screen 194. There are many types of pressure sensors 180A, such as a resistive pressure sensor, an inductive pressure sensor, and a capacitive pressure sensor. The capacitive pressure sensor may be a parallel plate including at least two conductive materials. When a force is applied to the pressure sensor 180A, a capacitance between electrodes changes. The electronic device 100 determines a pressure strength based on a change in the capacitance. When a touch operation is performed on the display screen 194, the electronic device 100 detects a touch operation intensity through the pressure sensor 180A. The electronic device 100 may also calculate a touch position based on a detection signal of the pressure sensor 180A. In some embodiments, touch operations that are applied to a same touch position but have different touch operation intensities may correspond to different operation instructions. For example, when a touch operation whose touch operation intensity is less than a first pressure threshold is performed on a short message application icon, an instruction of checking a short message is executed. When a touch operation whose touch operation intensity is greater than or equal to the first pressure threshold is performed on the short message application icon, an instruction of creating a new short message is executed.

The gyroscope sensor 180B may be configured to determine a movement posture of the electronic device 100. In some embodiments, an angular velocity of the electronic device 100 around three axes (that is, x, y, and z axes) may be determined through the gyroscope sensor 180B. The gyroscope sensor 180B may be used for image stabilization during photographing. For example, when the shutter is pressed, the gyroscope sensor 180B detects an angle at which the electronic device 100 jitters, and calculates, based on the angle, a distance for which a lens module needs to compensate, to allow the lens to cancel the jitter of the electronic device 100 through reverse motion, thereby implementing image stabilization. The gyroscope sensor 180B may further be configured in navigation and a motion sensing game scenario.

The barometric pressure sensor 180C is configured to measure an air pressure. In some embodiments, the electronic device 100 calculates an altitude through the air pressure value measured by the barometric pressure sensor 180C, and assists positioning and navigation.

A magnetic sensor 180D includes a Hall sensor. The electronic device 100 may detect opening and closing of a flip leather cover by using the magnetic sensor 180D. In some embodiments, when the electronic device 100 is a clamshell phone, the electronic device 100 may detect opening and closing of a flip through the magnetic sensor 180D. Further, characteristics such as automatic unlocking of the flip are set based on the detected opening and closing state of the leather cover or the opening and closing state of the flip.

The acceleration sensor 180E may detect a magnitude of acceleration of the electronic device 100 in each direction (generally three axes). When the electronic device 100 is stationary, a magnitude and a direction of a gravity may be detected. The acceleration sensor may be further configured to recognize a posture of the electronic device, and is applied to applications such as switching between landscape and portrait modes and a pedometer.

The distance sensor 180F is configured to measure a distance. The electronic device 100 may measure a distance through infrared light or laser. In some embodiments, in a shooting scenario, the electronic device 100 may measure a distance by using the distance sensor 180F, to implement quick focusing.

The proximity light sensor 180G may include, for example, a light-emitting diode (LED) and a light detector, for example, a photodiode. The light-emitting diode may be an infrared light-emitting diode. The electronic device 100 emits infrared light through the light-emitting diode. The electronic device 100 detects infrared reflected light from a nearby object by using the photodiode. When sufficient reflected light is detected, it may be determined that an object exists near the electronic device 100. When insufficient reflected light is detected, the electronic device 100 may determine that no object exists near the electronic device 100. The electronic device 100 may detect, by using the optical proximity sensor 180G, that a user holds the electronic device 100 close to an ear for a call, so as to implement automatic screen-off to save power. The optical proximity sensor 180G may also be configured to automatically unlock and lock the screen in a case mode and a pocket mode.

The ambient light sensor 180L is configured to perceive ambient light brightness. The electronic device 100 may adaptively adjust a brightness of the display screen 194 based on the perceived ambient light brightness. The ambient light sensor 180L may also be configured to automatically adjust white balance during photographing. The ambient light sensor 180L may further cooperate with the optical proximity sensor 180G to detect whether the electronic device 100 is in a pocket to prevent an accidental touch.

The fingerprint sensor 180H is configured to collect a fingerprint. The electronic device 100 may implement fingerprint unlocking, application lock accessing, fingerprint photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 180J. For example, when a temperature reported by the temperature sensor 180J exceeds a threshold, the electronic device 100 reduces performance of a processor near the temperature sensor 180J, to reduce power consumption and implement heat protection. In some other embodiments, when the temperature is lower than another threshold, the electronic device 100 heats the battery 142, to avoid an abnormal shutdown of the electronic device 100 caused by a low temperature. In some other embodiments, when the temperature is lower than still another threshold, the electronic device 100 boosts an output voltage of the battery 142 to prevent an abnormal shutdown caused by the low temperature.

The touch sensor 180K is also referred to as a "touch device". The touch sensor 180K may be arranged on the display screen 194. The touch sensor 180K and the display screen 194 form a touchscreen, which is also referred to as a "touch screen". The touch sensor 180K is configured to detect a touch operation performed on or near the touch sensor. The touch sensor may transfer the detected touch operation to the application processor to determine a touch event type. A visual output related to the touch operation may be provided through the display screen 194. In some other embodiments, the touch sensor 180K may alternatively be arranged on a surface of the electronic device 100 at a position different from that of the display screen 194.

The bone conduction sensor 180M may obtain a vibration signal. In some embodiments, the bone conduction sensor 180M may obtain vibration signals of the vibration bone of the vocal-cord part in a human body. The bone conduction sensor 180M may also contact a human pulse to receive a blood pressure beating signal. In some embodiments, the bone conduction sensor 180M may also be arranged in the headset, combined to form a bone conduction headset. The audio module 170 may obtain a speech signal through parsing based on the vibration signal of the vibration bone of the vocal-cord part that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or a touch button. The electronic device 100 may receive a button input, and generate a button signal input related to user setting and function control of the electronic device 100.

The motor 191 may generate a vibration prompt. The motor 191 may be used for an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different regions of the display screen 194. Different application scenarios (for example, a time reminder, information receiving, an alarm clock, and a game) may also correspond to different vibration feedback effects. Customization of a touch vibration feedback effect may further be supported.

The indicator 192 may be an indicator light that may be configured to indicate a charging state and a power change, or may be configured to indicate a message, a missed call, a notification, and the like.

The SIM card interface 195 is configured to connect a SIM card. The SIM card may be inserted into the SIM card interface 195 or plugged from the SIM card interface 195, to come into contact with or be separated from the electronic device 100. The electronic device 100 may support one or N SIM card interfaces, N being a positive integer greater than 1. The SIM card interface 195 can support a Nano SIM card, a Micro SIM card, a SIM card, and the like. A plurality of cards may be inserted into a same SIM card interface 195 simultaneously. The plurality of cards may be of a same type or different types. The SIM card interface 195 may also be compatible with different types of SIM cards. The SIM card interface 195 may also be compatible with an external memory card. The electronic device 100 interacts with a network through a SIM card, to implement functions such as a call and data communication. In some embodiments, the electronic device 100 uses an eSIM, that is, an embedded SIM card. The eSIM card may be embedded in the electronic device 100 and cannot be separated from the electronic device 100.

After the hardware architecture of the electronic device 100 is described, a software architecture of the electronic device 100 is described below by using examples.

A software system of the electronic device 100 may use a layered architecture, an event-driven architecture, a micro-kernel architecture, a microservice architecture, or a cloud architecture. In this embodiment of this application, the software structure of the electronic device 100 is described through examples by using an Android system with a layered architecture as an example.

Figures 2, 3:
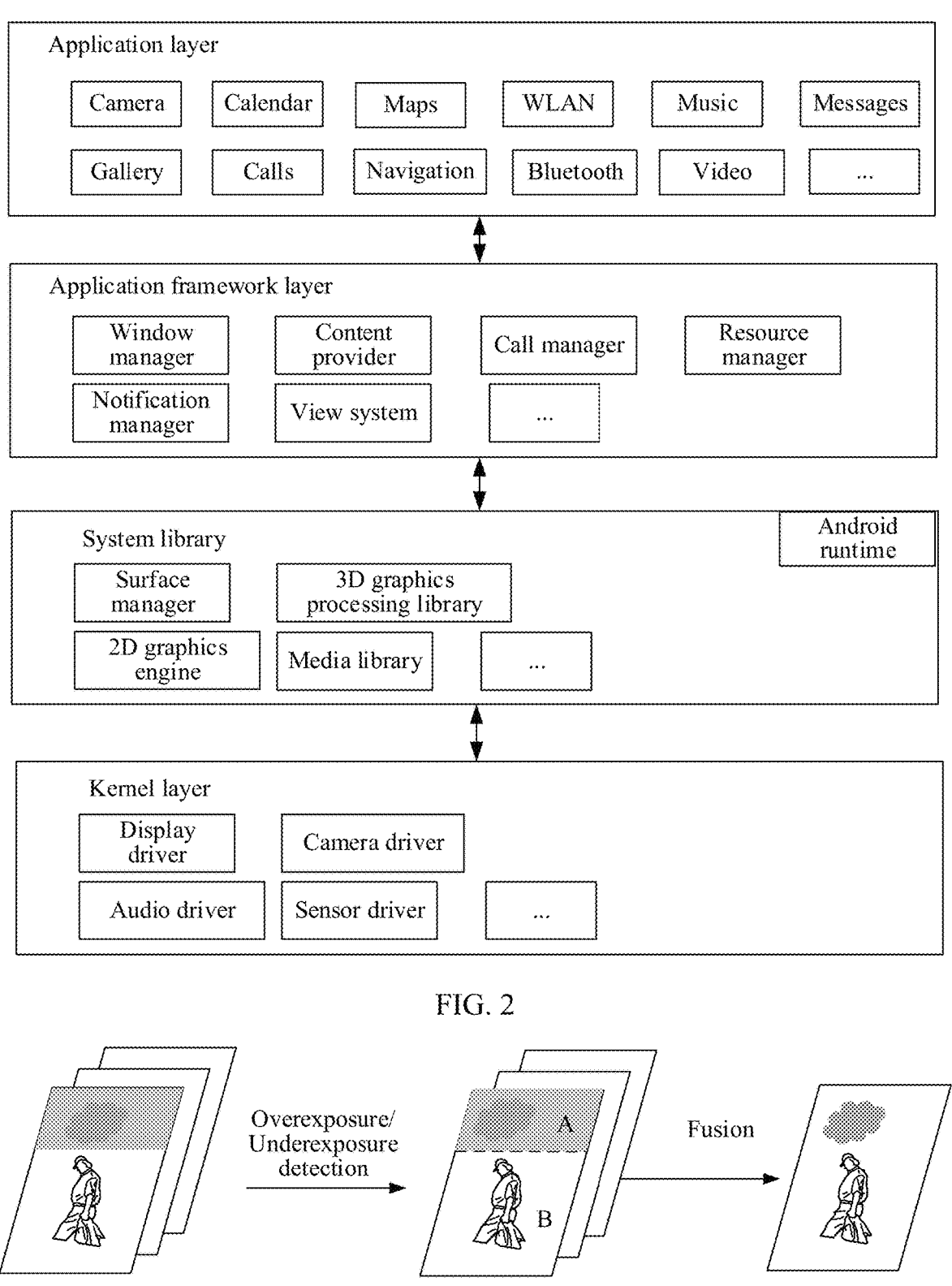
FIG. 2 is a block diagram of a software structure of an electronic device 100 according to an embodiment of this application.
FIG. 3 is a schematic diagram showing generation of a HDR image according to an embodiment of this application.

FIG. 2 is a block diagram of a software structure of an electronic device 100 according to an embodiment of this application.

In the layered architecture, software is divided into several layers, and each layer has a clear role and division of labor. The layers communicate with each other through a software interface. In some embodiments, the Android system is divided into four layers, which are an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for applications at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window application. The window manager may obtain a size of a display, determine whether there is a status bar, perform screen locking, take a screenshot of the screen, and the like. The content provider is configured to store and obtain data and make the data accessible to an application. The data may include a video, an image, audio, and like.

The view system includes visual controls such as a control for displaying a text and a control for display a picture. The view system may be configured to construct an application. A display interface may include one or more views. For example, a display interface including a short message notification icon may include a view for displaying a text and a view for displaying a picture.

The phone manager is configured to provide a communication function for the electronic device 100, for example, call status management (including connected and hang-up). The resource manager provides various resources such as a localized character string, an icon, an image, a layout file, and a video file for an application. The notification manager enables an application to display notification information in the status bar that may be used to convey a message of a notification type, where the message may disappear automatically after a short stay without user interaction. For example, the notification manager is configured to provide a notification of download completion, a message notification, and the like. The notification manager may alternatively be a notification that appears on a top status bar of the system in the form of a graph or a scroll bar text, for example, a notification of an application running on the background, or may be a notification that appears on the screen in the form of a dialog window. For example, text information is prompted on a status bar, a prompt tone is made, the electronic device vibrates, or an indicator light flashes.

The Android Runtime includes a core library and a virtual machine. The Android runtime is responsible for scheduling and managing the Android system.

The core library includes two parts: one part is a performance function that the Java language needs to invoke, and the other part is a core library of Android.

The application layer and the application framework layer are run in the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem, and provide fusion of 2D and 3D layers for a plurality of applications.

The media library supports playback and recording in a plurality of common audio and video formats, static image files, and the like. The media library may support a plurality of audio and video encoding formats such as MPEG4, H.264, MP3, AAC, AMR, JPG, and PNG.

The three-dimensional graphics processing library is configured to implement three-dimensional graphics drawing, image rendering, composition, layer processing, and the like. The 2D graphics engine is a drawing engine for 2D drawing. The kernel layer is a layer between hardware and software. The kernel layer includes at least a display drive, a camera drive, an audio drive, and a sensor drive.

A workflow of software and hardware of the electronic device 100 is described by using examples in combination with a HDR image capture scene.

In the HDR image capture scene, a finger or a stylus of a user contacts a display screen 194 of the electronic device 100, a touch sensor 180K arranged on the display screen 194 receives a touch operation, and a corresponding hardware interrupt is transmitted to a kernel layer. The kernel layer processes touch operations into touch events that can be read by the upper layer (for example, an action down event, an action move event, and an action up event). The action down event indicates initial contact of a finger or stylus with the touch screen, for example, the user touches a region of the touch screen with a stylus. The action move event indicates that the finger or stylus is used to swipe on the touch screen, for example, after touching, the stylus is used to swipe on the touch screen. The action up event indicates that the finger or stylus is separated from the touch screen. For example, after using the stylus to touch and swipe for a specific distance, the user lifts the stylus so that the stylus is separated from the touch screen.

The touch events are stored in the kernel layer. The application framework layer obtains the touch event from the kernel layer, and identifies a control corresponding to the advanced touch event and the touch operation corresponding to the touch event. For example, the touch operations include tap, double tap, and swipe. The touch operation is used as a tap operation, and the control corresponding to the tap operation is a shooting control of a video application by way of example. The video application calls an interface of the application framework layer, and then realizes the application function corresponding to the touch operation by calling the corresponding callback function.

(2) High-dynamic range (HDR) image. After the hardware architecture and the software architecture of the electronic device 100 provided in this embodiment of this application are described by using examples, the high-dynamic range image involved in this embodiment of this application is described below by using examples.

A high-dynamic range, also referred to as a wide dynamic range, is an image mapping technology that expresses a range of brightnesses beyond what a display can represent. For example, a display generally has an 8-bit color depth, which represents a total of 256 gray levels from black (0) to white (255). However, in daily scenes, the light intensity far exceeds this range. For example, the brightness of sunlight may reach the brightness level of 10 to the fifth power. If a brightness range in a real scene is directly mapped to the range [0, 255] in equal proportions, brightness ranges at a plurality of levels in the real scene are mapped to one brightness level, resulting in color banding of an image or appearance of a black region or a while region at both ends of the brightness range.

Through the high-dynamic range technology, the color banding during mapping can be effectively solved, and abundant brightness levels in life can be reproduced to produce realistic display effects.

FIG. 3 is a schematic flowchart of HDR image generation of a camera. As shown in FIG. 3, before HDR composition, Three, five or another number of images are captured by bracketing with different exposure values including a middle exposure value, a reduced exposure value, and an increased exposure value. For example, images with different exposure values may be obtained by adjusting the exposure value by a step of ⅓ EV, 0.5 EV, or 1 EV. If the scene includes an excessively dark region and a bright region, in these images with different exposure values, different regions of the image match different exposure values, and detailed information of the region can be clearly displayed. For example, an image captured with a small exposure value may clearly reveal detailed information in the bright region, and an image captured with a large exposure value may clearly reveal detailed information in the excessively dark region. The middle exposure value may clearly reveal the detailed information of a normal brightness in the scene. For example, in the topmost picture in FIG. 3, an upper region is relatively dark, and the details of the dark region are unsharp in an image captured with a normal exposure value.

After images with different exposure values are generated, region segmentation is performed on the images based on brightness information of the scene. As shown in FIG. 3, the upper region in the image is excessively dark, and the region is classified and marked as an excessively dark area. Alternatively, the scene may further include an excessively bright region, which may be classified and marked as an excessively bright region. When the images of the scene are acquired with different exposure values, the images acquired under a parameter such as the large exposure value may cause the excessively dark region to be more clearly displayed. The images acquired under a parameter such as a small exposure value may cause the excessively bright region to be more clearly displayed. Based on the marked excessively bright region and excessively dark region, combined with the exposure parameters of images, sharp parts of a plurality of images with different exposure values may be fused into an image with a wider brightness range, that is, the HDR image shown on the right of FIG. 3.

In order to realize clear display of the HDR image in the display with the low-dynamic range, nonlinear Tone Mapping ( ) may be performed on the HDR image, and the HDR image is mapped to the LDR (low-dynamic range) that the display can display, so as to preserve the details of light and dark contrast as much as possible, and achieve a more realistic final rendering effect.

For example, a HDR image may be rendered to floating-point textures, the floating-point textures of the HDR image are mapped to a cache area of LDR through tone mapping, then halo is added to the edge of strong light, and the bright strong light region is floodlit. Finally, a sharp image that can be displayed on the LDR display may be obtained by superimposing the image through tone mapping with the floodlit image. Tone mapping may include mapping based on contrast or gradient domain, which can better maintain the contrast of images and produce sharper images.

In the above HDR image generation process, it is necessary to perform region division on the image based on the brightness of the scene. For an indoor scene or a night scene, white may exist in the scene, if the point light sources are classified directly based on brightnesses of pixels in the scene image. For example, in the schematic diagram of point light source image detection shown in FIG. 4, a brightness of each pixel in an image is first determined, and then pixels in the image are classified into high-brightness pixels and non-high-brightness pixels based on a preset brightness threshold. The high-brightness pixels are connected to form a high-brightness region. If a high-brightness region exists in the image that matches a size of the point light source, it is considered that the image is a point light source image. The point light source image directly determined through the pixel brightness connected region is easily disturbed by white objects in the scene, so that white objects may exist only in the detected point light source image, resulting in low accuracy of point light source image detection and affecting image definition during subsequent HDR composition.

Based on the above problems, this embodiment of this application provides a point light source image detection method. Through the detection method, the accuracy of point light source image detection can be effectively improved, thereby facilitating generation of sharper HDR images and improving user experience.

Referring to FIG. 5, a schematic diagram of an implementation process of a point light source image detection method according to an embodiment of this application is shown, and details are as follows.

S501: Obtain to-be-tested images.

In this embodiment of this application, an obtaining manner of the to-be-tested images may include a manner in which an electronic device obtains an image locally or a manner in which the electronic device receives the image from another device. The obtaining, by the electronic device, the to-be-tested images locally may include acquiring the to-be-tested images by a camera of the electronic device or obtaining the to-be-tested images from a local memory of the electronic device. During the acquisition of the to-be-tested images, the camera of the electronic device may start acquiring the to-be-tested images when the electronic device receives an image acquisition instruction.

For example, when the electronic device receives a photographing instruction, the electronic device may acquire a plurality of images of a same scene through a camera lens.

In a possible implementation, the images of the same scene may be adjusted by exposure compensation to obtain a plurality of images with different exposure values. Alternatively, three to-be-tested images are obtained within a predetermined duration by changing exposure durations of −2 EV, 0 EV, and 2 EV. When a plurality of images of the same scene are captured through a lens, durations for acquiring the plurality of images may be determined based on a frame rate of a video acquired by the electronic device. For example, the duration may be less than or equal to an interval between frames of the video. Alternatively, a range of durations for acquiring the plurality of images is not limited. The to-be-tested images may further be images acquired at time points with different intervals.

Through the detection of the point light source images, the electronic device may composite a plurality of image frames acquired by the lens into a photo based on a result of the detection, which is used for responding to a "photo capture instruction". Alternatively, the plurality of images acquired by the electronic device may be composited into an image frame through point light source image detection, so as to generate a dynamic preview image under current lens parameters. For example, during running of a photo application, a user may dynamically display an image frame composited by a plurality of images acquired by the electronic device in an image display region after selecting the photo functions such as Portrait, Night Mode, Professional Mode, Large-aperture Mode, and Recording. Alternatively, the plurality of images acquired by the electronic device are composited into an image frame through point light source image detection, which may be a dynamic image frame of a shot video. In an image frame of the video composited by the plurality of images that are captured, the video may be a generated local video or a video transmitted to a server or another terminal. The video transmitted to the server or terminal may be a video in which two terminals are in a video call state, or a video generated when the terminals are in a livestreaming state.

When the to-be-tested images is an image received by the electronic device from another device, the to-be-tested images may be dynamically received. For example, an application scene of image processing includes two electronic devices, A and B. The electronic device A may be configured to dynamically or statically acquire a plurality of images and transmit the acquired plurality of images to the electronic device B. Since the electronic device A does not have a function of point light source image recognition, the point light source image cannot be effectively recognized, which is not conducive to improving image quality of the composited HDR image. The electronic device b has the function of point light source image recognition. After receiving a plurality of images transmitted by the electronic device A, the electronic device B recognizes point light source images in the received plurality of images through the point light source image recognition method provided in this embodiment of this application. When the point light source image in the received images is recognized, a point light source region in the point light source image may be determined. Through the marked point light source region, high-dynamic range images in the region may be composited, thereby improving quality of the composited HDR image. The electronic device A includes but is not limited to an electronic device such as a smart phone, a tablet computer, a notebook computer, and a web camera. The electronic device B includes but is not limited to an electronic device such as a smart phone, a tablet computer, and a notebook computer.

The point light source image detection method in this embodiment of this application may be used to better composite HDR images. Therefore, during the point light source image detection based on the method, the to-be-tested images may include an image of an indoor scene, a night scene or another scene without strong light. In the indoor scene, the night scene or another scene without strong light, the brightness range in the scene image is relatively low due to a relatively small brightness in the scene. If a point light source exists in the scene, the brightness range of the scene is obviously expanded. The electronic device needs to control capturing parameters to obtain a plurality of images with different exposure values, so as to meet the requirements for acquiring sharp scene images with different brightnesses. For example, in a high-brightness region, the exposure value may be reduced by controlling the exposure duration or an amount of fill-in light, so as to obtain a sharp image in the high-brightness region. However, a small exposure value may reduce the definition of images in a medium-brightness region, and cause loss of details in the low-brightness region. By increasing the exposure duration or a fill-in light brightness, the exposure value can be increased, which is beneficial to improve definition of details in the low-brightness region. After a clear region of images with different exposure values is determined, the determined clear region may be integrated, so as to obtain a sharp integrated image with a higher dynamic range.

S502: Determine brightnesses of the to-be-tested images, and perform screening based on the brightnesses of the images.

After a to-be-tested image is obtained, the brightnesses of the images (English full name is light value) may be determined in advance. The brightness of the image is compared with a preset third brightness threshold. If the brightness of the image is greater than the preset third brightness threshold, it is determined that the image is a non-point light source image. If the brightness of the image is less than or equal to the preset third brightness threshold, low-brightness information of the image may be further screened, or bright spot information of the image may be further screened.

Through screening of the image brightnesses of the to-be-tested images, an image that does not meet an image brightness requirement may be quickly screened as a non-point light source image, thereby further improving detection efficiency of point light source images.

In a possible implementation, low-brightness information and bright spot information of the to-be-tested images may also be directly screened, so as to determine whether a to-be-tested image is a point light source image.

After the to-be-tested images are obtained, different manners of obtaining image brightnesses may be determined based on different manners of obtaining the to-be-tested images.

For example, when the to-be-tested image is an image acquired by an electronic device through a lens, a brightness of the acquired image may be read through an image sensing chip. Alternatively, the image brightness may also be calculated based on parameters such as an aperture and sensitivity of the acquired image. When the to-be-tested image is an image acquired by an electronic device through a lens, or an image is received from another electronic device, the image brightness may be calculated by determining a brightness of each pixel in the image. That is to say, an average brightness of the whole image is calculated as the image brightness.

After to-be-tested images are obtained, the to-be-tested images may be classified into a set of images based on acquisition times of the to-be-tested images or based on contents of the to-be-tested images. For example, based on a set of images obtained by adjusting exposure parameters, images obtained at time points of a reduced exposure value, a normal exposure value, and an increased exposure value may be used as a set of images. Alternatively, the content of the to-be-tested images may be detected, and a set of images whose similarity is greater than a predetermined similarity threshold is used as a set of images.

During detection of the image brightness, image brightness detection and comparison may be performed on any image in a set of images. It is determined based on the comparison result of the image brightnesses whether an image of a current scene includes a point light source. If the image of the current scene includes the point light source, based on the determined position of the point light source in the image, in the subsequent HDR image composition, a sharp image of a region where the point light source is located may be obtained by obtaining a low-exposure image of the region where the point light source is located, thereby improving definition of the composited HDR image.

Alternatively, during detection of the image brightness, a detection as to whether the image acquired in the current scene is a point light source image may be performed by detecting normally exposed images one by one or sampling detection. If the image acquired in the current scene is a point light source image, the camera may be controlled to acquire images with different exposure values, thereby facilitating HDR composition of the image including the point light source and improving definition of the composited image.

S503: Determine low-brightness pixel information of the to-be-tested images, and perform screening based on the low-brightness information.

When it is determined whether a to-be-tested image is a point light source image, the to-be-tested images may be screened based on the low-brightness information of the images. The collected low-brightness information may be compared with a preset dark environment requirement. If the low-brightness information of the images meets the preset dark environment requirement, the images may be further screened based on the bright spot information in S504. If the image meets the requirement for the bright spot information, it may be determined that the image is a point light source image.

Alternatively, in a possible implementation, the images may also be screened through the bright spot information of the image first, and then the images are screened depending on whether the low-brightness information of the images meets the preset dark environment requirement when the images meet a preset bright spot information requirement.

When the to-be-tested images are images collected by an electronic device through a lens, and the images are screened based on the low-brightness information of the images, any image may be selected from a set of captured to-be-tested images with different exposure values for detection.

For example, one of the selected images for screening of low-brightness information may be an image with a normal exposure value. Through a set of images obtained by increasing the exposure duration, decreasing the exposure duration, and with normal exposure durations, the images with the normal exposure duration may be selected for low-brightness pixel detection. Alternatively, through a set of images obtained by increasing the fill-in light brightness, reducing the fill-in light brightness, and with normal fill-in light, the images with normal fill-in light may be selected for low-brightness pixel detection.

Certainly, the selected images are not limited to images with normal fill-in light brightness or images with normal exposure durations. An image with another fill-in light brightness or another exposure duration may also be selected. Since the brightness information of images with another exposure duration or fill-in light brightness changes relative to the brightnesses of images with normal fill-in light brightnesses or durations, the brightness threshold for comparison calculation may be adjusted accordingly during determination of the low-brightness information of images.

In a possible implementation, the pixel of each image in the to-be-tested images may further be compared with a preset first brightness threshold to determine the low-brightness pixel information in the to-be-tested images. By determining the low-brightness information included in each image, a non-point light source image that does not meet the low brightness requirement may be screened out. After the overexposed region and the underexposed area in the non-point light source image are screened out, it is determined that the image does not include the point light source, so that a relatively sharp image in the remaining region range can be obtained, which may be used for HDR image composition after the point light source image detection is completed.

Figure 6:
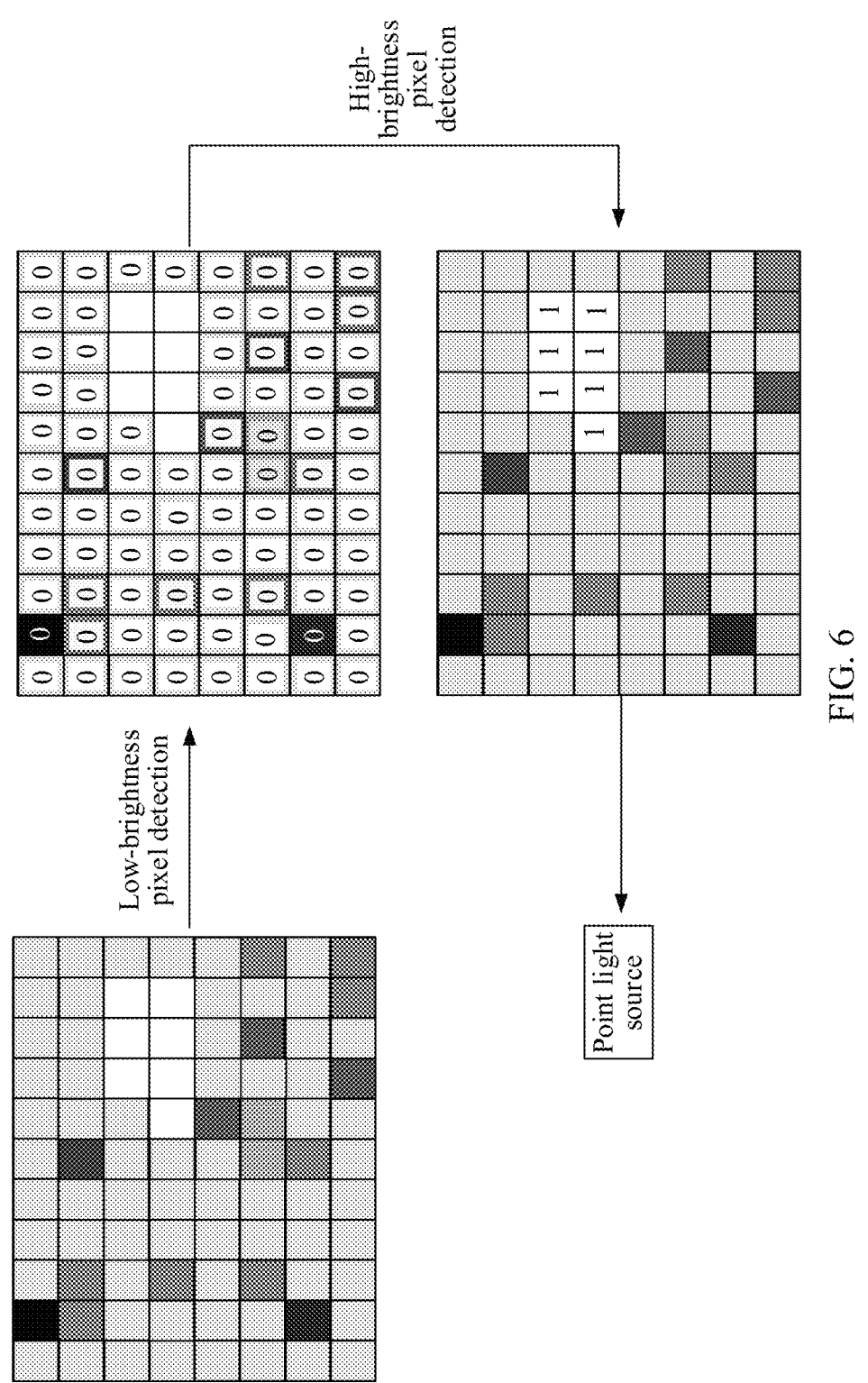
FIG. 6 is a schematic diagram of a point light source detection process according to an embodiment of this application.

The process of image screening through low-brightness information may be shown in FIG. 6, and the brightness of each pixel in the image for comparison may be determined first. The brightness of each pixel in the image is compared with the preset first brightness. If the brightness of the pixel is less than the preset first brightness threshold, the pixel may be marked as a low-brightness pixel, and the corresponding position may be marked with an identifier of "0". After the pixels are compared in the image one by one, the schematic diagram of identifiers shown in a middle chart of FIG. 6 may be obtained. Collecting statistics on the marked low-brightness pixels may include collecting statistics on the number and brightnesses of low-brightness pixels in the image.

The screening based on the low-brightness information may include respectively screening and calculating the proportion of low-brightness pixels in the images and the average brightness of the low-brightness pixels.

The proportion of low-brightness pixels in the image may be calculated by using the formula lowlightPixNumRatio=lowlightPixNum/(imageWidth*imageHight).

lowlightPixNumRatio is the proportion of low-brightness pixels in the image, lowlightPixNum is the number of low-brightness pixels, image Width is the number of pixels in a width direction of the image, and imageHight is the number of pixels in a height direction of the image.

The number of low-brightness pixels in the image may be determined based on the formula.

$$lowlightNum = \sum_{i,j} p\text{Image}[i, j] < \text{threshold} ? 1 : 0$$

pImage[i, j] represents any pixel point in the image, and threshold represents the first brightness threshold. When the brightnesses of pixels in the image are less than the first brightness threshold, the number of low-brightness pixels in the pixels is 1.

Figure 7:
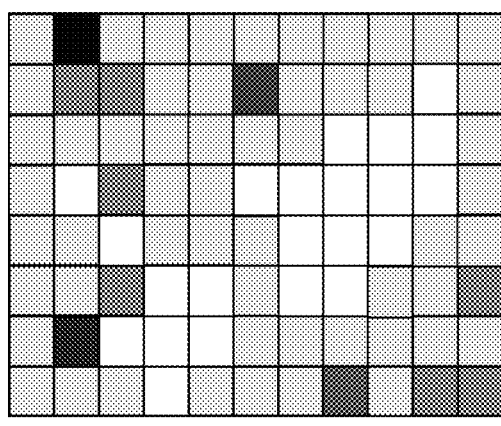
FIG. 7 is a schematic diagram of non-point light source images screened through a low-brightness pixel proportion according to an embodiment of this application.

Through detection of the proportion of low-brightness pixels in the images, if the proportion of low-brightness pixels is not less than the first brightness threshold, it indicates that the brightness of the current captured image scene is relatively large, and the point light source in the current scene has little influence on the image quality, so that the image can be screened as a non-point light source image. In the schematic diagram of a non-point light source shown in FIG. 7, the number of low-brightness pixels in the image is relatively small, and the proportion of low-brightness pixels in the image is relatively small and is less than the preset first proportion threshold, so that the image can be determined as a non-point light source image. A value range of the first brightness threshold may be [200-250]. For example, the first brightness threshold may be brightness values such as 220 and 240. A value range of the first proportion threshold may be [80%, 95%]. For example, the first proportion threshold may be values such as 85% and 90%.

Determining whether the low-brightness pixels of the image meet the preset dark environment requirement may include determining whether the average brightness of the low-brightness pixels is less than the preset average brightness threshold. Two to-be-screened parameters including the proportion of low-brightness pixels in the image and the average brightness value of low-brightness pixels may be combined for screening, so that the screened images can meet the requirements for the proportion of low-brightness pixels in the image and the average brightness of low-brightness pixels.

During screening through the average brightness of low-brightness pixels, the average brightness of low-brightness pixels may be calculated. The average brightness may be an average calculated after the brightnesses of the low-brightness pixels are summed and averaged, or may be an average calculated based on the normalized brightness value of each low-brightness pixel.

For example, the average brightness of the low-brightness pixels may be expressed as $$lowlightPixMean =$$

$$\frac{\sum_{i,j} p\,\mathrm{Im}\,\mathrm{age}[i,j] < threshold\,?\,\frac{p\,\mathrm{Im}\,\mathrm{age}[i,j]}{255}}{lowlightPixNum} \cdot lowlightPixMean$$

is the average brightness of low-brightness pixels, pImage[i, j] is any point in the image, lowlightPixNum is the number of low-brightness pixels, and threshold is an average threshold.

Figure 8:
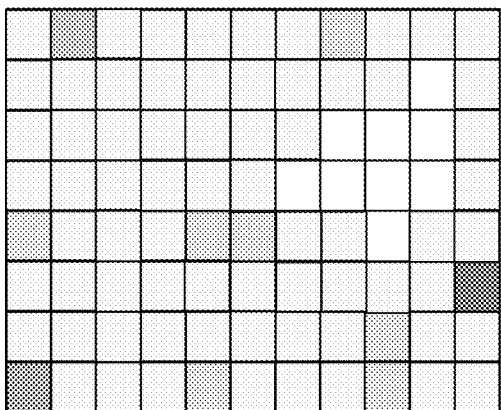
FIG. 8 is a schematic diagram of non-point light source images screened through an average brightness of low-brightness pixels according to an embodiment of this application.

Through screening of the average brightness of low-brightness pixels, a larger number of low-brightness pixels in the image may be screened out, but the overall brightness of the low-brightness pixels is not low enough, which results in a higher brightness of the overall image. In this case, the point light source has little influence on the image, and therefore the image in this scene may be defined as a non-point light source image. As shown in FIG. 8, although a larger number of low-brightness pixels exist in the image, and the proportion of low-brightness pixels in the image meets the preset first pixel proportion requirement, the overall image is relatively bright, and the average brightness of low-brightness pixels may be any value such as 40 and 50 in a range of from 30 to 60. The image shown in FIG. 8 may be screened as a non-point light source image, thereby improving the accuracy of image screening.

The images are screened through the proportion of low-brightness pixels in the images and the average brightness of low-brightness pixels, which can solve possible defects in considering the overall image brightness of the image during screening based on the image brightness, thereby further improving screening accuracy of point light source images.

After the proportion of low-brightness pixels and the average brightness are screened, if the image meets the preset dark environment requirement, it indicates that the background of the current image meets a background requirement of the point light source image, and the point light source may be further screened based on the selected image that meets the preset dark environment in S504.

S504: Determine bright spot information in the image, and perform screening based on the bright spot information.

During screening of images based on the bright spot information, images selected based on the dark environment requirement may be further screened. Alternatively, in a possible implementation, if bright spot information of the to-be-tested images is screened first, bright spot information of each image in the to-be-tested images may be screened, or one of the images may be selected by sampling for screening of bright spot information, or an image with any exposure value may be selected from a plurality of sets of images included in the to-be-tested images, including, for example, an image with a normal exposure, a high exposure, or a low exposure for screening of bright spot information.

As shown in FIG. 6, the screening of the images based on the bright spot information of the images may include steps of detection of high-brightness pixels and region connecting and comparison.

During the detection of high-brightness pixels, a brightness of each pixel in the images may be determined and then compared with a preset second brightness threshold. If the brightness of a pixel in the image is greater than the second brightness threshold, the pixel may be marked with an identifier of "1", that is, the pixel is marked as a high-brightness pixel. After the brightness of each pixel in the image is compared with the second brightness threshold, a schematic diagram of identifiers shown in the third chart of FIG. 6 may be obtained.

The second brightness threshold may be the same as the first brightness threshold. For example, the first brightness threshold and the second brightness threshold may be any values in a range of [200, 250]. Alternatively, the second brightness threshold and the first brightness threshold may be different, and both belong to [200, 250], and the second brightness threshold is greater than the first brightness threshold. If an image with a small exposure value in a set of images is selected to determine low-brightness pixels and high-brightness pixels in the images, the first brightness threshold and the second brightness threshold may be reduced, so that the high-brightness pixels and the low-brightness pixels included in the images can be accurately determined.

Figure 9A:
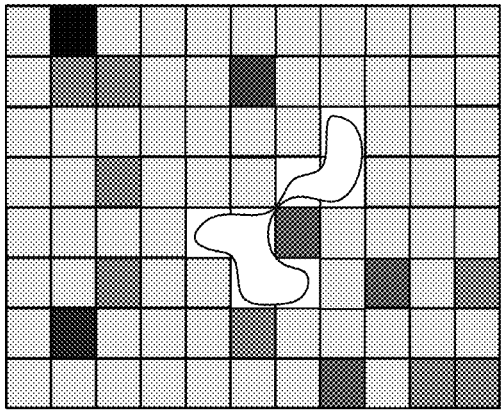
FIG. 9A is a schematic diagram showing determination of a bright spot connected region according to an embodiment of this application.

After the high-brightness pixels in the images are identified, the pixels with the identifier of "1" in the image may be connected for detection through a preset connected region determination method combined with the positions of the pixels, so as to determine that bright spots exist in the image. In the schematic diagram of determining the connected region shown in FIG. 8, the connected region is determined in a manner of determining a connected eight-neighborhood region. That is to say, for any high-brightness pixel, a detection as to whether nearest neighbor pixels in eight directions of up, down, left, right, upper left, lower left, upper right, and lower right of a center point are high-brightness pixels may be performed with the pixel as the center point. If it is detected that any pixel in the eight directions is a high-brightness pixel, the detected high-brightness pixel and the center point may form a connected region. For example, as shown in FIG. 9A, after three high-brightness pixels in the upper part are determined as a connected region, the lower left pixel of the upper connected region is used as the center point, and the high-brightness pixels may be searched in the lower left direction by searching in a range with an eight-neighborhood, thereby connecting the lower left pixel to the upper right connected region. Further through searching of the connected region, it may be determined that FIG. 9A includes a connected region, and a number of pixels included in the connected region is 6.

Figure 9B:
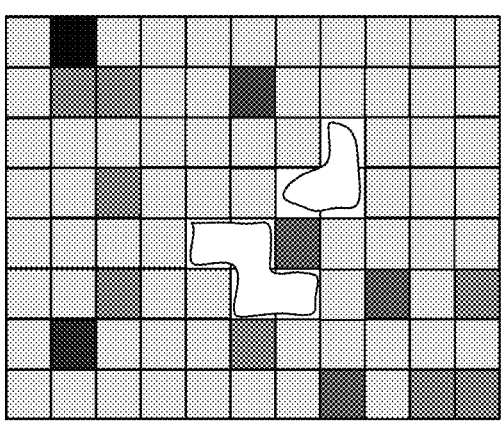
FIG. 9B is a schematic diagram showing determination of still another bright spot connected region according to an embodiment of this application.

As shown in FIG. 9B, a schematic diagram of an implementation of determining a connected region with a four-neighborhood is shown. That is to say, for any high-brightness pixel, the pixel is used as the center point, and high-brightness pixels are searched in the four directions of up, down, left, and right of the center point. As shown in FIG. 9B, after the three pixels in the upper part form a connected region, an effective high-brightness pixel is not found from the pixels in the lower left of the upper part through the pixels with a four-neighborhood. Therefore, two connected regions shown in FIG. 9B may be generated by searching high-brightness pixels with the four-neighborhood. Numbers of pixels in the connected region are respectively 3 and 4.

After the connected region composed of high-brightness pixels is determined, it may be determined whether each connected region meets a preset point light source requirement. For example, the second pixel proportion of pixels in a single connected region in the image may be determined, and the second pixel proportion may be compared with a preset first proportion range and a preset second proportion range, thereby determining that the connected region is point light source bright spots or large-area bright spots. That is to say, when the second pixel proportion belongs to the first proportion range, the connected region belongs to the point light source bright spot. When the second pixel proportion belongs to the second proportion range, the connected region belongs to the large-area bright spots.

Sizes of the connected regions determined with a four-neighborhood and an eight-neighborhood may be different. Therefore, in order to more accurately obtain the point light source requirement met by the connected region, the size of the proportion range for comparison with the connected region may be adjusted in a manner of determining the connected region. For example, the second pixel proportion of pixels in each connected region to the image pixels is determined, and the second pixel proportion may be compared with a preset first proportion range and a preset second proportion range. Through comparison of the second pixel proportion determined with the four-neighborhood with the second pixel proportion determined with the four-neighborhood, it is necessary to reduce the values of the first proportion range and the second proportion range. For example, the predetermined first proportion range for comparison may be [1/1000, x/1000], and the second proportion range may be (x/1000, 1], where the value range of x may be any value in [5, 10]. When the connected region is determined with the four-neighborhood, the first proportion range may be [1/1000, 5/1000], and the second proportion range may be (5/1000, 1]. When the connected region is determined with an eight-neighborhood, the first proportion range may be [1/1000, 7/1000], and the second proportion range may be (7/1000, 1].

When it is detected that the second pixel proportion in the image belongs to the preset second proportion range, it indicates that large-area bright spots exist in the image, that is, a connected area with a large area exists. When relatively large bright spots exist in the image, it is not necessary to continue to detect the point light source bright spots, and the image may be directly determined as a non-point light source image.

Figure 10:
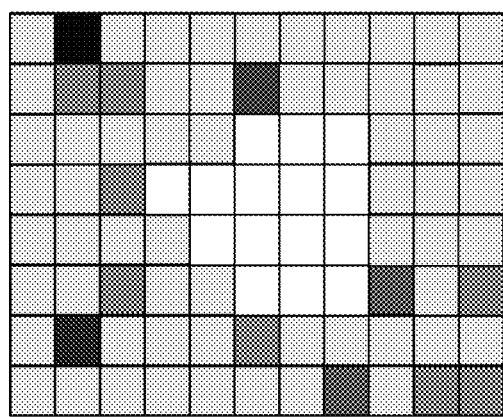
FIG. 10 is a schematic diagram of non-point light source images screened through large-area bright spots according to an embodiment of this application.

FIG. 10 is a schematic diagram for bright spot detection. Through detection, the image meets a screening requirement for a dark background environment. During detection of the bright spots in the image, the second pixel proportion of the determined high-brightness pixels belongs to the second proportion range, that is, the bright spots determined by the high-brightness pixels are large-area bright spots. The large-area bright spots may be detected when a HDR image is generated, and details in the image may be obtained by reducing the exposure value, so that the image may be determined as a non-point light source image.

When it is detected that the second pixel proportion in the image belongs to the preset first proportion range, that is, the connected region belongs to the point light source bright spot, the bright spots with the second pixel proportion belonging to the first proportion range may be counted. If it is still not detected that the second pixel proportion belongs to the preset second proportion range after the detection is completed, it may be determined whether the number of counted point light source bright spots are greater than zero, that is, it is determined whether point light source bright spots exist. If the point light source bright spots exist, it may be determined that the image is a point light source image.

Figure 11:
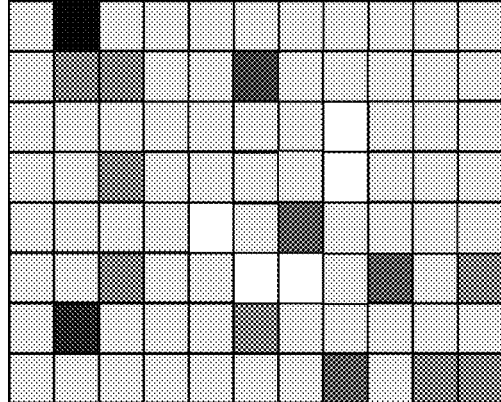
FIG. 11 is a schematic diagram of point light sources screened through a number of bright spots according to an embodiment of this application.

As shown in FIG. 11, two connected regions are determined through high-brightness pixels. In addition, the second pixel proportions of the two connected regions both belong to the preset first proportion range, so that it may be determined that the number of point light source bright spots included in the image is 2. Since no large-area bright spots are detected in the image, and the number of point light source bright spots is greater than 0, when a dark environment detection requirement of the background are met in advance in FIG. 11, it may be determined that the image is a point light source image.

In the process of determining the bright spots, the breadth-first-search method may be used to find out the bright spots in the image (including point light source spots (the second pixel proportion of the connected region belongs to the preset first proportion range) and large-area bright spots (the second pixel proportion of the connected region belongs to the preset first proportion range)). The implementation logic may be as follows:

---

Point Light Source Detection Algo Section2

Input: pImage

Output:cnt,bigAeraOverExposure //cnt: Number of point light source bright spots satisfying pixel proportion, -continued

```
        //bigAearaOverExposure: Whether large-area bright spots exist
    bigAreaOverExposure=false
    num=0
    while(i∈[0,imageHeight],j∈[0,imageWidth])
        if pImage[i*imageWidth+j]>=threshold&&mark[i*imageWidth+j]==0;
            mark[i*imageWidth+j]=1
            num++
            ret=FindValidPoint(pImage,num,I,j,imageWidth,imageHeight,   mark)//Find   a
    bright spot, start searching for a size of the bright spot, and return to detect whether the bright spot is
    a large-area bright spot
            ...//Determine a pixel proportion of bright spots, and when the threshold is met,
    cnt+++
            If ret==-1;
            bigAreaOverExposure==ture//A large area of bright spots appears
            break
        num=0
    if cnt>0&&bigAreaOverExposure;
    return ture.
```

A detection as to whether the image meets a dark environment capture requirement of point light source images is performed through low-brightness pixels, and the size requirement of bright spots in the image is detected through high-brightness pixels. When the image cannot be determined as a non-point light source image after the above screening, it may be considered that the image is a point light source image.

For the determined point light source image, a high-dynamic range image may be generated from the image based on the bright spot information included in the point light source image. In a scene of a dynamically generated video, based on the determined position of the point light source in the point light source image, fusion of a high-dynamic range may be dynamically performed on the image including the point light source.

After it is determined whether the to-be-tested images are point light source images, HDR images may be further fused based on the detected point light source images. In the application diagram of point light source images shown in FIG. 13A and FIG. 13B, point light source detection and overexposure/underexposure detection may be simultaneously performed on a plurality of to-be-tested images. A point light source image and a non-point light source image may be obtained through the point light source image detection. An overexposed region and an underexposed region in the image may be determined through the overexposure detection and underexposure detection. For the detected point light source images, in combination with the detected images including the overexposed region and the underexposed region, an image with another exposure value including the same content may be searched, and it is determined that sharp images of the underexposed region, the overexposed region, or the point light source region exist. Through fusion, HDR images with higher definition are generated, thereby improving image capture experience of a user or enhancing image browsing experience of the user.

Figure 12:
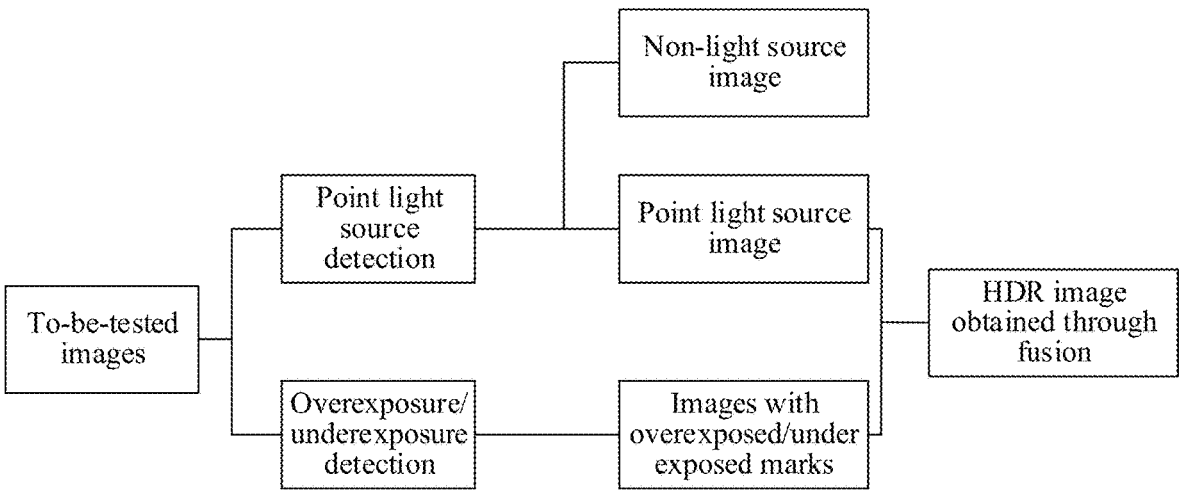
FIG. 12 is an application example diagram of point light source image detection according to an embodiment of this application.
Figure 13A:
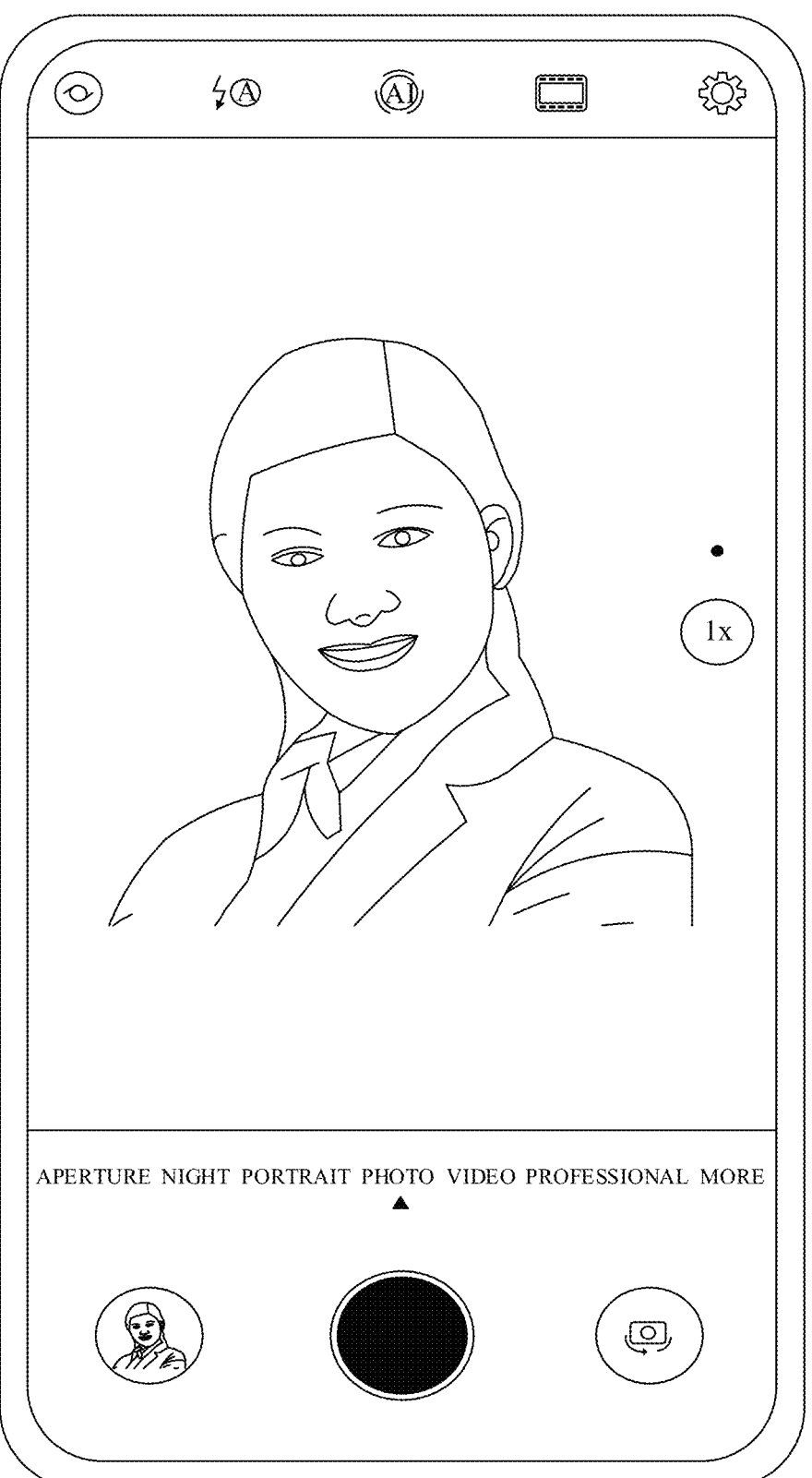
FIG. 13A and FIG. 13B are a schematic diagram of a photo optimization scene based on point light source image detection according to an embodiment of this application.
Figures 13A, 13B:
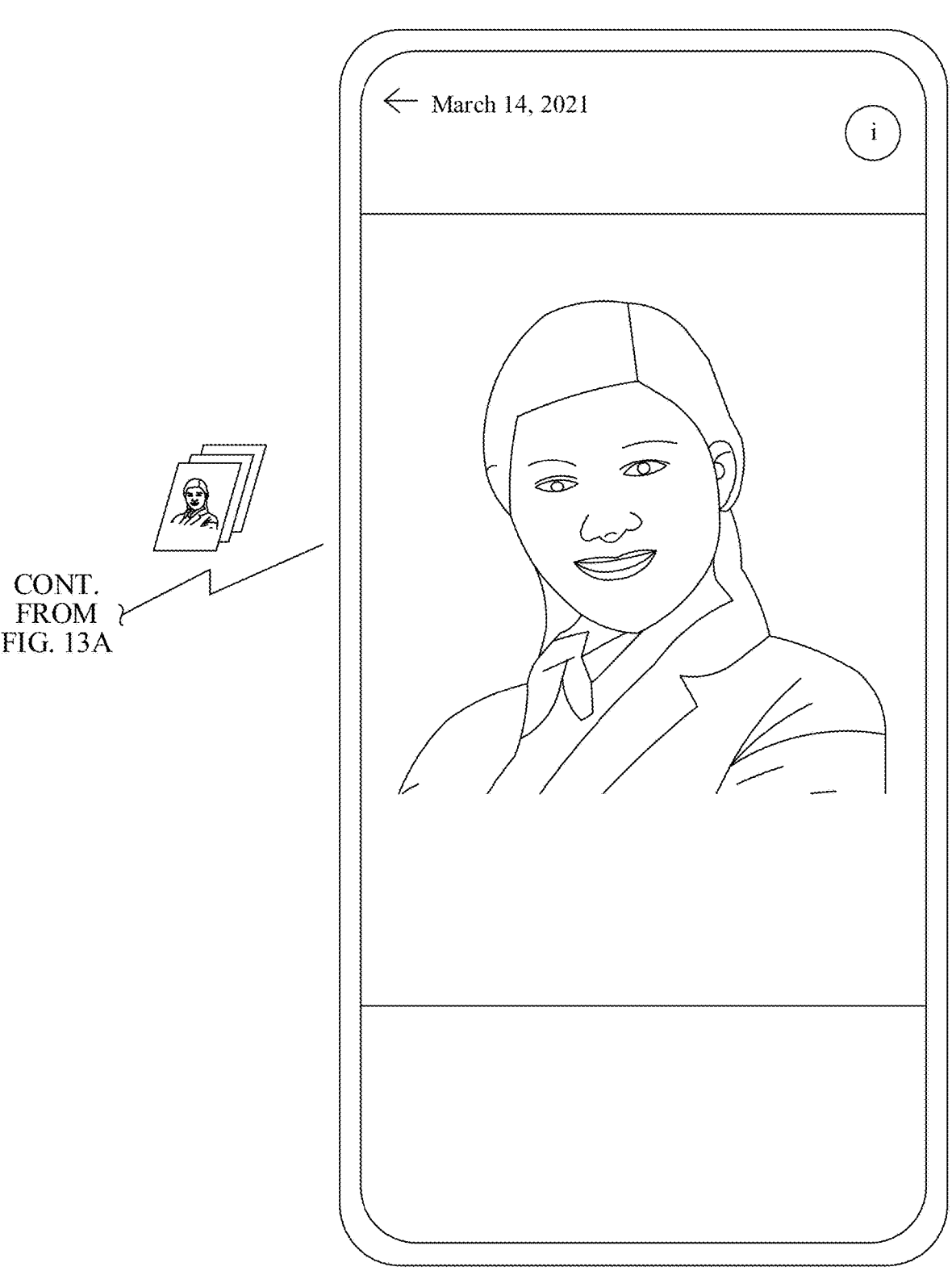

FIG. 13A and FIG. 13B are a schematic diagram of an application example of a point light source image detection method according to an embodiment of this application. As shown in FIG. 13A, an electronic device may obtain, by taking photos or video recording, a set of images for compositing HDR images. A number of the set of photos may be 3, 5, or another number. Since the electronic device may not have the point light source image detection method shown in this embodiment of this application, in order to obtain a sharper image, the set of captured images may be transmitted to an electronic device. The electronic device recognizes a point light source image of the received image through the built-in point light source image detection program, and based on a result of the recognition, a HDR image with better definition may be generated based on the process shown in FIG. 12.

The images transmitted by the electronic device to the electronic device may be a set of static images, and a photo with higher definition is generated through a set of static images. Alternatively, the transmitted images may be a set of dynamic images. For example, when the electronic device and the electronic device are in a video call state, the electronic device may dynamically acquire images with different exposure values and transmit the acquired images to the electronic device, and the electronic device displays a video with better definition at the electronic device through the composition processing shown in FIG. 12.

Figure 14:
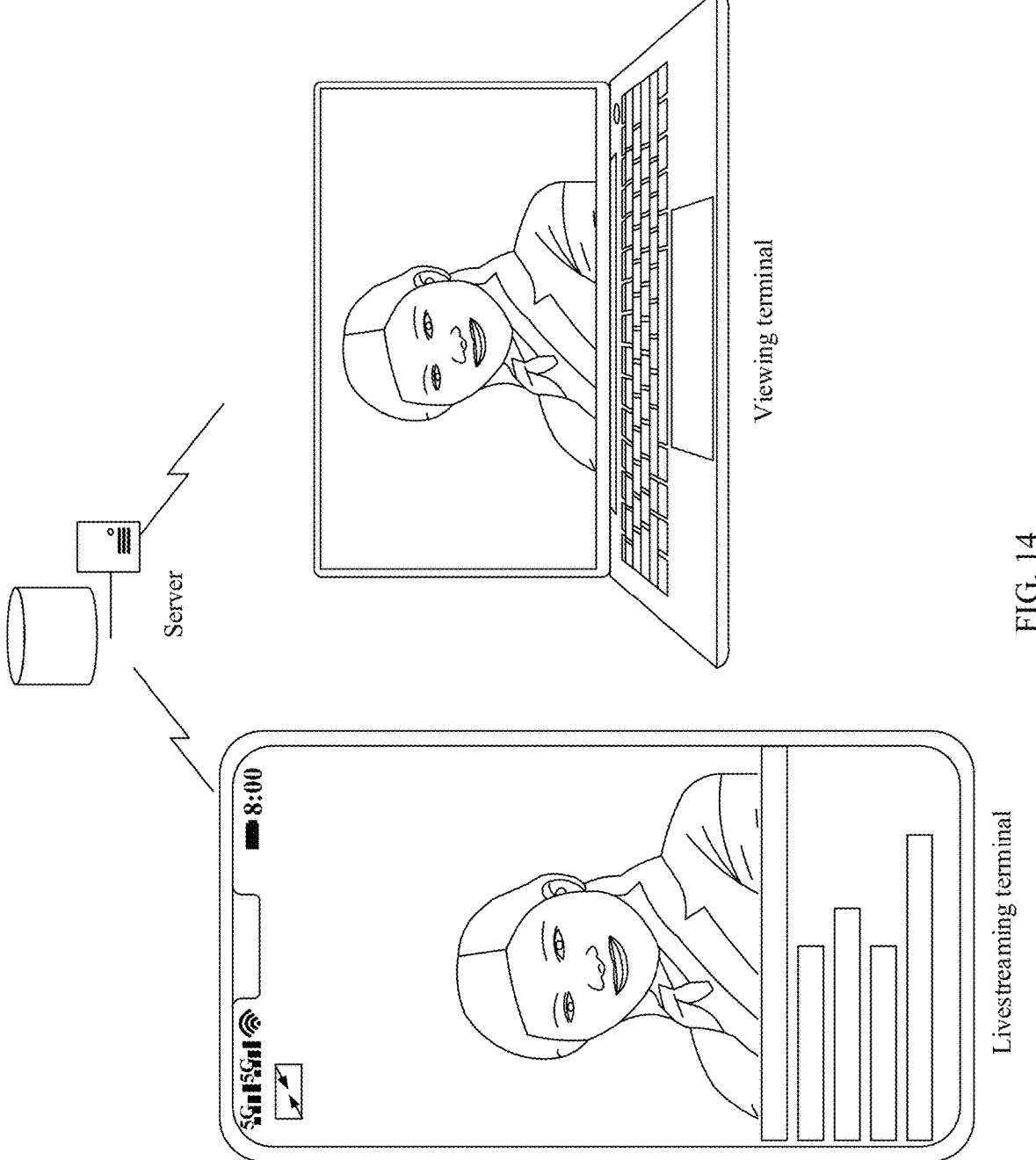
FIG. 14 is a schematic diagram of application of a livestreaming scene based on point light source image detection according to an embodiment of this application.

Alternatively, the point light source image detection method may also be applied to a device such as a server. As shown in FIG. 14, during livestreaming at a livestreaming terminal, since the livestreaming terminal does not detect the point light source image, the acquired images may be transmitted to the server, and the server composites video pictures including the HDR images based on the built-in point light source image detection program and the HDR image generation method shown in FIG. 12 for broadcast and display on a viewing terminal of livestreaming.

The viewing terminal may not have the built-in point light source image detection program as shown in this embodiment of this application. The video optimized and composited by the server is received, so that viewing experience on the viewing terminal can be improved.

Certainly, through the point light source image detection program built into the server, optimization and composition of images may further be performed in scenes such as a video call and photo transmission in addition to a livestreaming scene.

Figure 15:
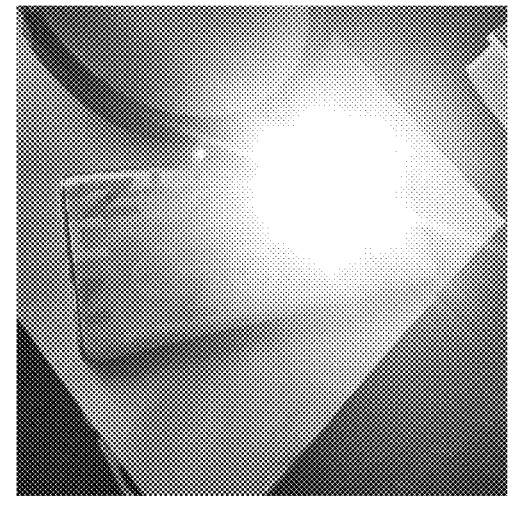
FIG. 15 is a schematic diagram of a non-optimized point light source image according to an embodiment of this application.
Figure 16:
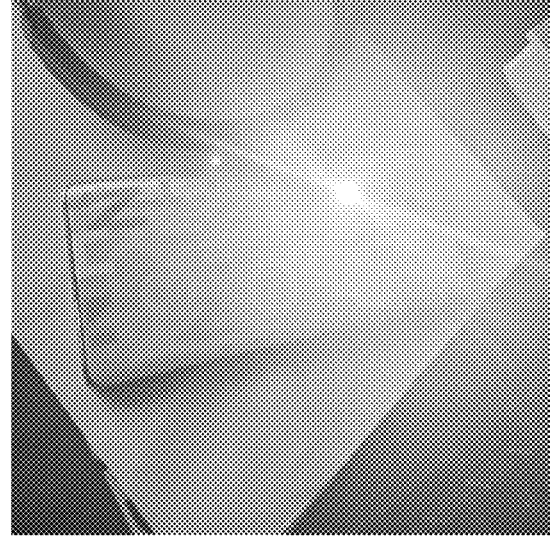
FIG. 16 is a schematic diagram of an optimized point light source image according to an embodiment of this application.

Through the point light source image detection method shown in this embodiment of this application, based on the HDR image generation method shown in FIG. 12, definition of the point light source image can be effectively improved. For example, FIG. 15 is a schematic diagram of a point light source image according to an embodiment of this application. In the point light source image, due to a relatively high brightness of the point light source, details of a region near the point light source in the image disappear. After it is determined that the image is a point light source image, a low-exposure image corresponding to the image may be found or generated, and the details near the point light source may be further recovered based on the found low-exposure image, so that the images shown in FIG. 16 can be composited, and the details near the point light source in the composited image are clearer, which can help improve image quality.

An electronic device provided in an embodiment of this application may include a memory, a processor, and a computer program stored in the memory and executable by the processor. When the processor executes the computer program, the method according to any one of the method embodiments is implemented.

An embodiment of this application further provides a computer-readable storage medium. The computer-readable storage medium stores a computer program. When the computer program is executed by a processor, steps in the above method embodiments may be implemented.

An embodiment of this application provides a computer program product, the computer program product, when run on an electronic device, causing the electronic device to implement steps in the above method embodiments.

An embodiment of this application further provides a chip system. The chip system includes a processor, and the processor is coupled to a memory and configured to execute a computer program stored in the memory, to implement the method in each of the method embodiments. The chip system may be a single chip or a chip module composed of a plurality of chips.

In the foregoing embodiments, the descriptions of the embodiments have respective focuses. For a part that is not described in detail in an embodiment, reference may be made to related descriptions in other embodiments. It should be understood that the sequence number of steps in the above embodiments does not mean the order of execution, and the order of execution of each process should be determined by its function and internal logic, and should not constitute any limitation on the implementation process of the embodiments of this application. In addition, in the description of the specification of this application and the appended claims, the terms "first", "second" and "third" are only used for distinction and description and cannot be understood as indicating or implying relative importance. Reference to "one embodiment" or "some embodiments" described in this specification of this application means that a specific characteristic, structure, or feature described in combination with the embodiment is included in one or more embodiments of this application. Therefore, statements such as "in one embodiment", "in some embodiments", "in some other embodiments", and "in some additional embodiments" in the differences in this specification do not necessarily refer to the same embodiment, but mean "one or more but not all embodiments", unless otherwise specially emphasized in other ways.

Finally, it should be noted that, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A point light source image detection method, comprising:

obtaining to-be-tested images, and determining pixel brightnesses of the to-be-tested images;

determining low-brightness pixels and high-brightness pixels in the images based on the pixel brightnesses, wherein each of the low-brightness pixels is a pixel whose brightness is less than a preset first brightness threshold, and each of the high-brightness pixels is a pixel whose brightness is greater than or equal to a preset second brightness threshold;

filtering, based on the low-brightness pixels, out an image that does not meet a preset dark environment requirement, and filtering, based on the high-brightness pixels, out an image that does not meet a preset point light source size; and determining, based on a result of the filtering, whether a to-be-tested image is a point light source image;

wherein the filtering, based on the low-brightness pixels, out an image that does not meet the preset dark environment requirement comprises:

determining an overall brightness of only the low-brightness pixels;

filtering, based on the overall brightness of the low-brightness pixels exceeding a preset brightness, out a non-point light source image;

wherein the filtering, based on the high-brightness pixels, out an image that does not meet a preset point light source size comprises:

connecting the high-brightness pixels to generate a high-brightness region;

determining a second pixel proportion of pixels of a single high-brightness region in the image; and filtering, based on the second pixel proportion, out a non-point light source image that does not meet the preset point light source size.

2. The method according to claim 1, wherein the filtering, based on the low-brightness pixels, out an image that does not meet a preset dark environment requirement comprises:

determining a first pixel proportion of the low-brightness pixels in the image; and filtering out a non-point light source image in which the first pixel proportion is less than a preset first proportion threshold.

3. The method according to claim 1, wherein the filtering, based on the low-brightness pixels, out an image that does not meet a preset dark environment requirement comprises:

determining an average brightness of the low-brightness pixels; and filtering out a non-point light source image in which the average brightness of the low-brightness pixels is less than a preset average brightness threshold.

4. The method according to claim 3, wherein the average brightness is an average of brightnesses of normalized pixels of the low-brightness pixels.

5. The method according to claim 1, wherein the filtering, based on the second pixel proportion, out an image that does not meet a preset point light source size comprises:

determining a number of high-brightness regions in which the second pixel proportion belongs to a preset first proportion range and a number of high-brightness regions in which the second pixel proportion belongs to a preset second proportion range, wherein the first proportion range is smaller than the second proportion range;

if a high-brightness region in which the second pixel proportion belongs to the preset second proportion range exists in the image, the image is an image that does not meet the preset point light source size; or if the high-brightness region in which the second pixel proportion belongs to the preset second proportion range does not exist, and the number of high-brightness regions in which the second pixel proportion belongs to the preset first proportion range is 0, the image is an image that does not meet the preset point light source size.

6. The method according to claim 1, wherein the connecting the high-brightness pixels to generate a high-brightness region comprises:

generating the high-brightness region by searching for high-brightness pixels with a four-neighborhood of the high-brightness pixels; or generating the high-brightness region by searching for high-brightness pixels with an eight-neighborhood of the high-brightness pixels.

7. The method according to claim 1, wherein before the determining low-brightness pixels and high-brightness pixels in the images based on the pixel brightnesses, the method further comprises:

obtaining brightnesses of the to-be-tested images; and determining that each of the to-be-tested images is a non-point light source image when each of the brightnesses is greater than a preset third brightness threshold.

8. An image processing method, comprising:

determining two or more to-be-processed images;

performing point light source detection on the to-be-processed images according to the method of claim 1, and determining whether the to-be-processed images are point light source images;

determining a high-brightness region in each of the point light source images when determining that the to-be-tested images comprise the point light source image; and performing fusion calculation for high-dynamic range images based on the point light source images and the marked high-brightness region.

9. The method according to claim 8, wherein the to-be-processed images are images with different brightnesses captured in a same scene.

10. A non-transitory computer-readable storage medium, storing a computer program, wherein when the computer program is executed by a processor, operations are performed, the operations comprising:

obtaining to-be-tested images, and determining pixel brightnesses of the to-be-tested images;

determining low-brightness pixels and high-brightness pixels in the images based on the pixel brightnesses, wherein each of the low-brightness pixels is a pixel whose brightness is less than a preset first brightness threshold, and each of the high-brightness pixels is a pixel whose brightness is greater than or equal to a preset second brightness threshold;

filtering, based on the low-brightness pixels, out an image that does not meet a preset dark environment requirement, and filtering, based on the high-brightness pixels, out an image that does not meet a preset point light source size; and determining, based on a result of the filtering, whether a to-be-tested image is a point light source image;

wherein the filtering, based on the low-brightness pixels, out an image that does not meet the preset dark environment requirement comprises:

determining an overall brightness of only the low-brightness pixels;

filtering, based on the overall brightness of the low-brightness pixels exceeding a preset brightness, out a non-point light source image;

wherein the filtering, based on the high-brightness pixels, out an image that does not meet a preset point light source size comprises:

connecting the high-brightness pixels to generate a high-brightness region;

determining a second pixel proportion of pixels of a single high-brightness region in the image; and filtering, based on the second pixel proportion, out a non-point light source image that does not meet the preset point light source size.

11. The non-transitory computer-readable storage medium according to claim 10, wherein the filtering, based on the low-brightness pixels, out an image that does not meet a preset dark environment requirement comprises:

determining a first pixel proportion of the low-brightness pixels in the image; and filtering out a non-point light source image in which the first pixel proportion is less than a preset first proportion threshold.

12. The non-transitory computer-readable storage medium according to claim 10, wherein the filtering, based on the low-brightness pixels, out an image that does not meet a preset dark environment requirement comprises:

determining an average brightness of the low-brightness pixels; and filtering out a non-point light source image in which the average brightness of the low-brightness pixels is less than a preset average brightness threshold.

13. The non-transitory computer-readable storage medium according to claim 12, wherein the average brightness is an average of brightnesses of normalized pixels of the low-brightness pixels.

14. The non-transitory computer-readable storage medium according to claim 10, wherein the filtering, based on the second pixel proportion, out an image that does not meet a preset point light source size comprises:

determining a number of high-brightness regions in which the second pixel proportion belongs to a preset first proportion range and a number of high-brightness regions in which the second pixel proportion belongs to a preset second proportion range, wherein the first proportion range is smaller than the second proportion range;

if a high-brightness region in which the second pixel proportion belongs to the preset second proportion range exists in the image, the image is an image that does not meet the preset point light source size; or if the high-brightness region in which the second pixel proportion belongs to the preset second proportion range does not exist, and the number of high-brightness regions in which the second pixel proportion belongs to the preset first proportion range is 0, the image is an image that does not meet the preset point light source size.

15. The non-transitory computer-readable storage medium according to claim 10, wherein the connecting the high-brightness pixels to generate a high-brightness region comprises:

generating the high-brightness region by searching for high-brightness pixels with a four-neighborhood of the high-brightness pixels; or generating the high-brightness region by searching for high-brightness pixels with an eight-neighborhood of the high-brightness pixels.

16. The non-transitory computer-readable storage medium according to claim 10, wherein before the determining low-brightness pixels and high-brightness pixels in the images based on the pixel brightnesses, the method further comprises:

obtaining brightnesses of the to-be-tested images; and determining that each of the to-be-tested images is a non-point light source image when each of the brightnesses is greater than a preset third brightness threshold.

\* \* \* \* \*